(12) United States Patent
Lickfelt et al.

(10) Patent No.: US 10,410,448 B2
(45) Date of Patent: Sep. 10, 2019

(54) SYSTEM AND METHOD FOR PROVIDING A COUNTDOWN NOTIFICATION RELATING TO A MOVEMENT OF A BARRIER

(71) Applicant: Honda Motor Co., Ltd., Tokyo (JP)

(72) Inventors: Brian K. Lickfelt, Powell, OH (US); Kevin Lamm, Pataskala, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/803,293

(22) Filed: Nov. 3, 2017

(65) Prior Publication Data

US 2019/0051071 A1 Feb. 14, 2019

Related U.S. Application Data

(60) Provisional application No. 62/544,422, filed on Aug. 11, 2017, provisional application No. 62/542,755, filed on Aug. 8, 2017.

(51) Int. Cl.
| | |
|---|---|
| *B60R 25/00* | (2013.01) |
| *G07C 9/00* | (2006.01) |
| *H04W 4/021* | (2018.01) |
| *H04W 4/04* | (2009.01) |
| *E05F 15/00* | (2015.01) |

(Continued)

(52) U.S. Cl.
CPC .......... *G07C 9/00309* (2013.01); *E05F 15/00* (2013.01); *E05F 15/73* (2015.01); *E05F 15/77* (2015.01); *E05F 15/79* (2015.01); *H04W 4/021* (2013.01); *H04W 4/04* (2013.01); *E05F 2015/767* (2015.01); *E05Y 2400/44* (2013.01); *E05Y 2400/81* (2013.01); *E05Y 2900/106* (2013.01); *E05Y 2900/50* (2013.01); *G07C 2009/00769* (2013.01); *G07C 2009/00928* (2013.01)

(58) Field of Classification Search
CPC ...... G07C 9/00309; G07C 2009/00769; G07C 2009/00928; E05F 15/00; E05F 15/73; E05F 15/77; E05F 15/79; E05F 2015/767; H04W 4/021; H04W 4/04; E05Y 2900/106; E05Y 2400/44; E05Y 2400/81; E05Y 2900/50
USPC ....................................................... 340/5.71
See application file for complete search history.

(56) References Cited

U.S. PATENT DOCUMENTS

| | | | |
|---|---|---|---|
| 5,350,986 A | 9/1994 | Long et al. | |
| 5,625,980 A * | 5/1997 | Teich | G08B 21/20 49/26 |

(Continued)

OTHER PUBLICATIONS

Office Action of U.S. Appl. No. 15/713,782 dated Sep. 7, 2018, 47 pages.

(Continued)

*Primary Examiner* — Kerri L McNally
*Assistant Examiner* — Thang D Tran
(74) *Attorney, Agent, or Firm* — Rankin, Hill & Clark LLP

(57) ABSTRACT

A system and method for providing a countdown notification relating to a movement of a barrier that include measuring a duration of the movement of the barrier. The system and method also include determining a current state of the barrier and sending at least one barrier control signal to remotely control movement of the barrier. The system and method further include presenting the countdown notification relating to the movement of the barrier.

20 Claims, 10 Drawing Sheets

(51) Int. Cl.
*E05F 15/73* (2015.01)
*E05F 15/77* (2015.01)
*E05F 15/79* (2015.01)

(56) References Cited

U.S. PATENT DOCUMENTS

| | | | |
|---|---|---|---|
| 5,793,300 A * | 8/1998 | Suman | G07C 9/00182 |
| | | | 340/12.29 |
| 5,900,806 A | 5/1999 | Issa et al. | |
| 6,091,217 A * | 7/2000 | Parsadayan | E05F 15/41 |
| | | | 318/283 |
| 6,091,330 A | 7/2000 | Swan et al. | |
| 6,271,765 B1 | 8/2001 | King et al. | |
| 6,400,956 B1 | 6/2002 | Richton | |
| 6,469,464 B1 * | 10/2002 | McCall | E05F 15/668 |
| | | | 318/245 |
| 6,476,732 B1 | 11/2002 | Stephan | |
| 6,526,335 B1 | 2/2003 | Treyz et al. | |
| 6,563,278 B2 | 5/2003 | Roman | |
| 6,615,132 B1 | 9/2003 | Nagasaka et al. | |
| 6,711,474 B1 | 3/2004 | Treys et al. | |
| 6,911,898 B2 | 6/2005 | Chung | |
| 6,975,203 B2 | 12/2005 | Brookbank et al. | |
| 7,039,391 B2 | 5/2006 | Rezvani et al. | |
| 7,046,119 B2 | 5/2006 | Ghabra et al. | |
| 7,068,163 B2 | 6/2006 | Sari et al. | |
| 7,071,813 B2 | 7/2006 | Fitzgibbon | |
| 7,088,265 B2 | 8/2006 | Tsui et al. | |
| 7,127,847 B2 | 10/2006 | Fitzgibbon et al. | |
| 7,170,248 B2 | 1/2007 | Tsui et al. | |
| 7,170,426 B2 | 1/2007 | Tsui et al. | |
| 7,183,933 B2 | 2/2007 | Dzurko et al. | |
| 7,205,908 B2 | 4/2007 | Tsui et al. | |
| 7,310,043 B2 | 12/2007 | Mamaloukas | |
| 7,327,107 B2 | 2/2008 | Mullet et al. | |
| 7,327,108 B2 | 2/2008 | Mullet et al. | |
| 7,332,999 B2 | 2/2008 | Fitzgibbon | |
| 7,342,368 B2 | 3/2008 | Roman | |
| 7,358,480 B2 | 4/2008 | Mullet et al. | |
| 7,498,936 B2 | 3/2009 | Maeng | |
| 7,545,833 B2 | 6/2009 | Chau et al. | |
| 7,602,283 B2 | 10/2009 | John | |
| 7,609,146 B2 | 10/2009 | Tang et al. | |
| 7,635,960 B2 | 12/2009 | Mullet et al. | |
| 7,710,284 B2 | 5/2010 | Dzurko et al. | |
| 7,733,218 B2 | 6/2010 | Drago et al. | |
| 7,881,733 B2 | 2/2011 | Staton et al. | |
| 7,911,358 B2 | 3/2011 | Bos et al. | |
| 7,973,678 B2 | 7/2011 | Petricoin, Jr. et al. | |
| 8,049,595 B2 | 11/2011 | Olson et al. | |
| 8,058,970 B2 | 11/2011 | Mullet et al. | |
| 8,068,006 B2 | 11/2011 | Martin | |
| 8,111,997 B2 | 2/2012 | Butler | |
| 8,115,616 B2 | 2/2012 | Gonzaga | |
| 8,179,229 B2 | 5/2012 | Mullet | |
| 8,244,448 B2 | 8/2012 | Newman | |
| 8,279,040 B2 | 10/2012 | Laird | |
| 8,291,642 B2 | 10/2012 | Jankovsky | |
| 8,299,893 B2 | 10/2012 | Mullet | |
| 8,330,572 B2 | 12/2012 | Rodriguez et al. | |
| 8,400,264 B2 | 3/2013 | Mullet et al. | |
| 8,531,266 B2 | 9/2013 | Shearer et al. | |
| 8,577,392 B1 | 11/2013 | Pai et al. | |
| 8,643,467 B2 | 2/2014 | Chutorash et al. | |
| 8,648,695 B2 | 2/2014 | Fitzgibbon et al. | |
| 8,653,962 B2 | 2/2014 | Maeng | |
| 8,710,978 B2 | 4/2014 | Stählin et al. | |
| 8,878,646 B2 | 11/2014 | Chutorash et al. | |
| 8,922,356 B2 | 12/2014 | Lambert et al. | |
| 8,994,496 B2 | 3/2015 | Freese et al. | |
| 9,007,168 B2 | 4/2015 | Bos et al. | |
| 9,129,502 B2 | 9/2015 | Naim et al. | |
| 9,169,684 B2 | 10/2015 | Fan et al. | |
| 9,189,952 B2 | 11/2015 | Chutorash et al. | |
| 9,208,629 B2 | 12/2015 | Saladin et al. | |
| 9,230,378 B2 | 1/2016 | Chutorash et al. | |
| 9,264,673 B2 | 2/2016 | Chundrlik, Jr. et al. | |
| 9,326,100 B2 | 4/2016 | Guo et al. | |
| 9,412,264 B2 | 8/2016 | Geerlings et al. | |
| 9,430,939 B2 | 8/2016 | Shearer et al. | |
| 9,507,335 B2 | 11/2016 | Wilder et al. | |
| 9,509,962 B2 | 11/2016 | Chundrlik, Jr. et al. | |
| 9,539,930 B2 | 1/2017 | Geerlings | |
| 9,542,834 B2 | 1/2017 | Geerlings et al. | |
| 9,551,781 B2 | 1/2017 | Baxley et al. | |
| 9,555,814 B2 | 1/2017 | Neubecker et al. | |
| 9,556,812 B2 | 1/2017 | Ozkan | |
| 9,581,456 B2 | 2/2017 | Liao et al. | |
| 9,600,950 B2 | 3/2017 | Chutorash et al. | |
| 9,620,005 B2 | 4/2017 | Geerlings et al. | |
| 9,656,691 B2 | 5/2017 | Heimberger et al. | |
| 9,672,670 B2 | 6/2017 | Menkveld | |
| 9,879,466 B1 * | 1/2018 | Yu | E05F 15/76 |
| 2002/0002443 A1 * | 1/2002 | Ames | G07B 15/04 |
| | | | 702/188 |
| 2002/0170685 A1 * | 11/2002 | Weik, III | E05F 1/006 |
| | | | 160/133 |
| 2003/0102836 A1 * | 6/2003 | McCall | E05F 15/668 |
| | | | 318/445 |
| 2003/0174045 A1 * | 9/2003 | Zhang | E05F 15/668 |
| | | | 340/5.64 |
| 2003/0197594 A1 | 10/2003 | Olson et al. | |
| 2003/0197595 A1 | 10/2003 | Olson et al. | |
| 2003/0216139 A1 * | 11/2003 | Olson | G08C 17/02 |
| | | | 455/419 |
| 2005/0140321 A1 * | 6/2005 | Wojciak, Jr. | G07C 9/00182 |
| | | | 318/452 |
| 2005/0206497 A1 * | 9/2005 | Tsui | G07C 9/00182 |
| | | | 340/5.71 |
| 2005/0212681 A1 * | 9/2005 | Dzurko | G08B 21/14 |
| | | | 340/632 |
| 2006/0071155 A1 | 4/2006 | Chen | |
| 2006/0077035 A1 * | 4/2006 | Mamaloukas | G07C 9/00309 |
| | | | 340/5.61 |
| 2006/0157206 A1 * | 7/2006 | Weik, III | E05F 1/006 |
| | | | 160/188 |
| 2006/0158344 A1 | 7/2006 | Bambini et al. | |
| 2006/0220834 A1 * | 10/2006 | Maeng | G08B 21/24 |
| | | | 340/539.1 |
| 2007/0046232 A1 | 3/2007 | Mullet et al. | |
| 2007/0085067 A1 * | 4/2007 | Lewis | E01F 13/065 |
| | | | 256/73 |
| 2007/0188120 A1 | 8/2007 | Mullet et al. | |
| 2008/0061926 A1 | 3/2008 | Strait | |
| 2008/0224819 A1 | 9/2008 | Callentine | |
| 2009/0189779 A1 | 7/2009 | Gao | |
| 2009/0269635 A1 * | 10/2009 | Muramatsu | H01M 8/04298 |
| | | | 429/515 |
| 2010/0085145 A1 | 4/2010 | Laird | |
| 2010/0127882 A1 | 5/2010 | Sitarski | |
| 2010/0265034 A1 * | 10/2010 | Cap | B60R 25/245 |
| | | | 340/5.71 |
| 2011/0032073 A1 | 2/2011 | Mullet et al. | |
| 2011/0032115 A1 | 2/2011 | Kwiecinski et al. | |
| 2011/0193700 A1 * | 8/2011 | Fitzgibbon | G05B 15/02 |
| | | | 340/541 |
| 2012/0255231 A1 | 10/2012 | Jenkins et al. | |
| 2012/0265874 A1 * | 10/2012 | Hoh | G06Q 10/02 |
| | | | 709/224 |
| 2013/0033359 A1 | 2/2013 | Ji et al. | |
| 2013/0042530 A1 | 2/2013 | Leivenzon et al. | |
| 2013/0086841 A1 * | 4/2013 | Luper | E05F 15/43 |
| | | | 49/28 |
| 2013/0117078 A1 * | 5/2013 | Weik, III | G06Q 10/00 |
| | | | 705/13 |
| 2013/0147600 A1 * | 6/2013 | Murray | G07C 9/00571 |
| | | | 340/5.71 |
| 2013/0147616 A1 | 6/2013 | Lambert et al. | |
| 2014/0118111 A1 | 5/2014 | Saladin et al. | |
| 2014/0125499 A1 | 5/2014 | Cate et al. | |
| 2014/0167961 A1 * | 6/2014 | Finlow-Bates | H04W 4/021 |
| | | | 340/541 |

(56) References Cited

U.S. PATENT DOCUMENTS

| | | |
|---|---|---|
| 2014/0266593 A1 | 9/2014 | Nye et al. |
| 2014/0305599 A1 | 10/2014 | Pimenov |
| 2014/0320263 A1 | 10/2014 | Fan et al. |
| 2015/0002262 A1 | 1/2015 | Geerlings et al. |
| 2015/0084750 A1 | 3/2015 | Fitzgibbon |
| 2015/0084779 A1* | 3/2015 | Saladin ............. G07C 9/00896 340/686.6 |
| 2015/0137941 A1 | 5/2015 | Bauer et al. |
| 2015/0148983 A1 | 5/2015 | Fitzgibbon |
| 2015/0235495 A1 | 8/2015 | Hall et al. |
| 2015/0266356 A1* | 9/2015 | Fischer ................. E05F 15/77 701/36 |
| 2015/0302672 A1* | 10/2015 | Kalsi ....................... G07C 3/00 340/5.61 |
| 2015/0302735 A1 | 10/2015 | Geerlings et al. |
| 2015/0302736 A1 | 10/2015 | Geerlings et al. |
| 2015/0302737 A1 | 10/2015 | Geerlings et al. |
| 2015/0348344 A1 | 12/2015 | Rettig et al. |
| 2016/0018798 A1 | 1/2016 | Jiang et al. |
| 2016/0053699 A1 | 2/2016 | Ozkan |
| 2016/0055742 A1 | 2/2016 | Wang et al. |
| 2016/0101736 A1 | 4/2016 | Geerlings et al. |
| 2016/0104364 A1 | 4/2016 | Brooks et al. |
| 2016/0117879 A1 | 4/2016 | Chutorash et al. |
| 2016/0130853 A1* | 5/2016 | Tehranchi ............... E05F 15/60 340/3.71 |
| 2016/0148451 A1* | 5/2016 | Menkveld .......... G07C 9/00126 340/5.71 |
| 2016/0300415 A1 | 10/2016 | Deneen et al. |
| 2016/0312517 A1 | 10/2016 | Elie et al. |
| 2016/0314362 A1 | 10/2016 | Elie et al. |
| 2016/0321914 A1 | 11/2016 | Geerlings et al. |
| 2016/0343233 A1 | 11/2016 | Wassef et al. |
| 2016/0375898 A1 | 12/2016 | Breuel et al. |
| 2017/0030737 A1 | 2/2017 | Elie et al. |
| 2017/0034485 A1 | 2/2017 | Scalisi |
| 2017/0106874 A1 | 4/2017 | Neubecker et al. |
| 2017/0108873 A1 | 4/2017 | Tanaka et al. |
| 2017/0114585 A1 | 4/2017 | Ozkan |
| 2017/0138111 A1* | 5/2017 | Lietz ...................... E05F 15/70 |
| 2017/0140646 A1 | 5/2017 | Lu et al. |
| 2017/0147887 A1 | 5/2017 | Be et al. |
| 2017/0154482 A1 | 6/2017 | Osborne |
| 2017/0175433 A1* | 6/2017 | Kang ...................... E05F 15/77 |
| 2018/0030764 A1 | 2/2018 | Shaw et al. |
| 2018/0194344 A1* | 7/2018 | Wang .................. G05D 1/0221 |
| 2018/0216389 A1 | 8/2018 | Tsui et al. |
| 2018/0247475 A1 | 8/2018 | Archbold |

OTHER PUBLICATIONS

Notice of Allowance of U.S. Appl. No. 15/810,609 dated Jul. 11, 2018, 30 pages.

Office Action of U.S. Appl. No. 15/861,027 dated Dec. 14, 2018, 40 pages.

Office Action of U.S. Appl. No. 15/696,211 dated Jan. 2, 2019, 48 pages.

Office Action of U.S. Appl. No. 15/884,730 dated Jan. 10, 2019, 35 pages.

Office Action of U.S. Appl. No. 15/791,063 dated Oct. 30, 2018, 71 pages.

Notice of Allowance of U.S. Appl. No. 15/791,063 dated Mar. 29, 2019, 21 pages.

Office Action of U.S. Appl. No. 15/861,027 dated May 1, 2019, 14 pages.

* cited by examiner

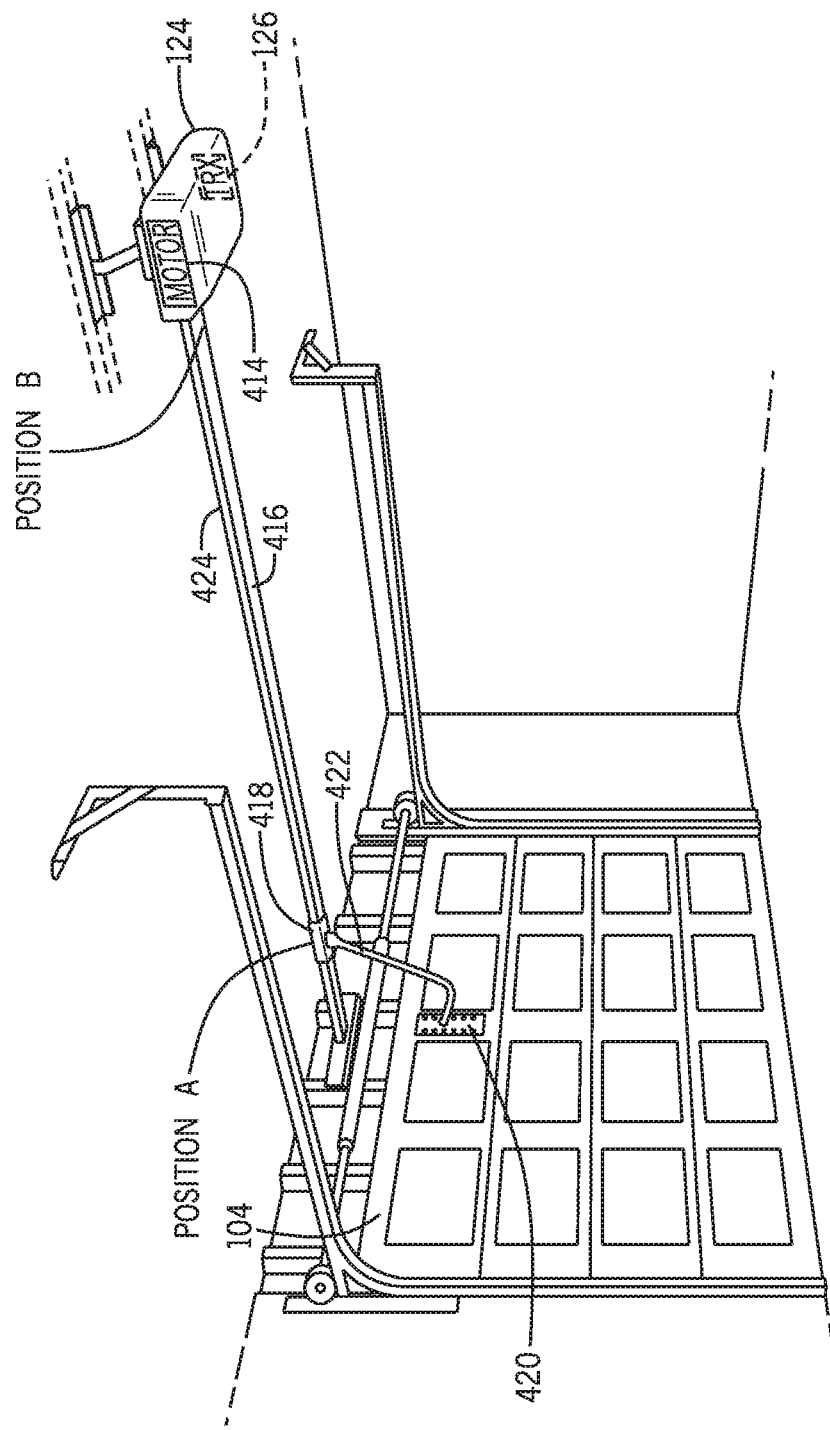

SYSTEM AND METHOD FOR PROVIDING A COUNTDOWN NOTIFICATION RELATING TO A MOVEMENT OF A BARRIER

RELATED APPLICATIONS

This application claims priority to U.S. Provisional Application Ser. No. 62/542,755 filed on Aug. 8, 2017, which is expressly incorporated herein by reference. This application also claims priority to U.S. Provisional Application Ser. No. 62/544,422 filed on Aug. 11, 2017, which is also expressly incorporated herein by reference.

BACKGROUND

In many cases, movable barriers such as garage doors may take a significant amount of time to move from one state to another. For example, as a vehicle approaches a home location, it may take a significant amount of time for a garage door opener to completely open the garage door from a fully closed state to a fully opened state to allow the vehicle to be parked within a garage. In many instances the vehicle arrives at a site of the movable barrier with it having only partially completing its opening cycle. Consequently, the vehicle driver must completely stop the vehicle and wait for the movable barrier to completely open thereby wasting time and energy.

The vehicle driver may be able to actuate sending of a movable barrier opening signal some time in advance of the arrival at the site of the movable barrier to avoid such a wait. However, it may be undesirable to initiate the opening of the movable barrier too preemptively, as this could unsecure contents placed behind the movable barrier until such time that the vehicle reaches the barrier. Additionally, since all movable barriers operate differently based on type, installation conditions, and other environmental factors, it may not be easy for the vehicle driver to estimate how long the movable barrier takes to completely open from a fully closed state to a fully opened state to actuate the sending of the movable barrier opening signal. Additionally, it may undesirable for the vehicle driver to estimate at which point the vehicle is within a range to send the movable barrier signal to open the movable barrier to avoid the wait.

BRIEF DESCRIPTION

According to one aspect, a method for providing a countdown notification relating to a movement of a barrier that includes measuring a duration of the movement of the barrier. The method also includes determining a current state of the barrier. The current state of the barrier includes at least one of: an opened state and a closed state. The method additionally includes sending at least one barrier control signal to remotely control movement of the barrier. The at least one barrier control signal is based on the current state of the barrier. The method further includes presenting the countdown notification relating to the movement of the barrier. The countdown notification includes a countdown of the duration of the movement of the barrier to traverse from at least one of: the closed state to the opened state, or the opened state to the closed state.

According to another aspect, a system for providing a countdown notification relating to a movement of a barrier that includes a memory storing instructions when executed by a processor cause the processor to measure a duration of the movement of the barrier. The instructions also cause the processor to determine a current state of the barrier. The current state of the barrier includes at least one of: an opened state and a closed state. The instructions additionally cause the processor to send at least one barrier control signal to remotely control movement of the barrier. The at least one barrier control signal is based on the current state of the barrier. The instructions further cause the processor to present the countdown notification relating to the movement of the barrier. The countdown notification includes a countdown of the duration of the movement of the barrier to traverse from at least one of: the closed state to the opened state, or the opened state to the closed state.

According to still another aspect, a computer readable storage medium storing instructions that when executed by a computer, which includes at least a processor, causes the computer to perform a method that includes measuring a duration of a movement of a barrier. The instructions also include determining a current state of the barrier. The current state of the barrier includes at least one of: an opened state and a closed state. The instructions additionally include sending at least one barrier control signal to remotely control movement of the barrier. The at least one barrier control signal is based on the current state of the barrier. The instructions further include presenting the countdown notification relating to the movement of the barrier. The countdown notification includes a countdown of the duration of the movement of the barrier to traverse from at least one of: the closed state to the opened state, or the opened state to the closed state.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 4B is an illustrative example of the barrier that is configured as a garage door and a barrier controller that is configured as a garage door opener according to an exemplary embodiment;

DETAILED DESCRIPTION

Figure 1:
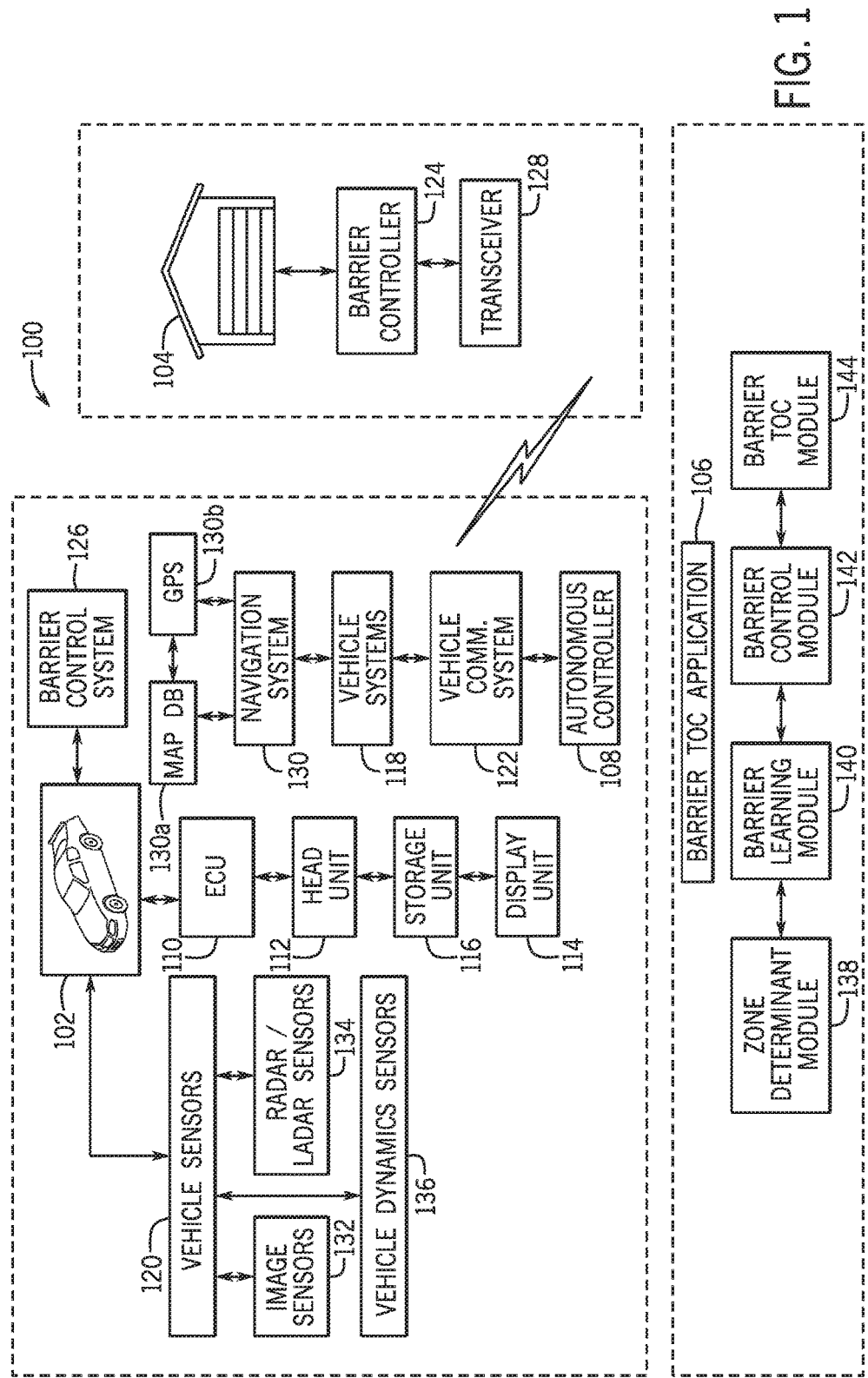
FIG. 1 a schematic view of an operating environment for implementing systems and methods for providing a countdown notification within a vehicle relating to a movable barrier according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an operating environment 100 for implementing systems and methods for providing a countdown notification within a vehicle 102 relating to a movable barrier (barrier) 104 according to an exemplary embodiment. The components of the environment 100, as well as the components of other systems, hardware architectures, and software architectures discussed herein, can be combined, omitted, or organized into different architectures for various embodiments.

Generally, the environment includes a barrier movement time of completion countdown application (barrier TOC application) 106 that is utilized to measure a duration of a movement of the movable barrier 104 as it is traversed from a closed state to an opened state (e.g., fully open state) and from the opened state to the closed state (e.g., fully closed state). Additionally, the barrier TOC application 106 may determine that the vehicle 102 is being driven within one or more geo-fence zones that are within a predetermined vicinity of the barrier 104 and may send one or more signals to open or close the barrier 104 based on a current state (e.g., opened or the closed state) of the barrier 104.

As discussed in more detail below, the barrier TOC application 106 may present a countdown notification user interface (countdown interface) (not shown) that may include a countdown notification that presents the measured duration of the movement of the barrier 104 when the barrier 104 is traversed from the closed state to the opened state, hereinafter referred to as the opening time of completion (opening TOC). Additionally, the countdown interface may include the countdown notification (not shown) that presents the measured duration of the movement of the barrier 104 when the barrier 104 is traversed from the opened state to the closed state, hereinafter referred to as the closing time of completion (closing TOC). The countdown notification may be used to notify a driver (not shown) of the vehicle 102 of the expected time of completion for the barrier 104 to traverse from the closed state to the opened state or from the opened state to the closed state based on the current opened or closed state of the barrier 104.

In the illustrated embodiment of FIG. 1, the vehicle 102 may include a plurality of components that may be operably connected for computing communication via a bus (not shown) (e.g., a Controller Area Network (CAN) or a Local Interconnect Network (LIN) protocol bus), an input/output interface (I/O interface) and/or other wired and wireless technologies. The plurality of components of the vehicle 102 may generally include an electronic control unit (ECU) 110, a head unit 112, a display unit 114, a storage unit 116, and an autonomous controller 108. Additionally, the plurality of components of the vehicle 102 may also include a plurality of vehicle systems 118 and a plurality of vehicle sensors 120 that will be discussed in more detail below.

In an exemplary embodiment, the ECU 110 of the vehicle 102 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 110 and other components, networks, and data sources, of the environment 100. In one embodiment, the ECU 110 may include a system clock (not shown) that may be utilized to measure a duration of one or more activities being executed by the plurality of components of the vehicle 102 and/or external components that communicate with the vehicle 102. As discussed below, the barrier TOC application 106 may utilize the system clock to measure the duration of the movement of the barrier 104 based on the plurality of barrier movement response signals that are evaluated by the application 106.

In some embodiments, the ECU 110 may be operably connected for computer communication to the autonomous controller 108. The autonomous controller 108 may be utilized to provide a partially autonomous vehicle operation or a fully autonomous vehicle operation. The autonomous controller 108 may be operably connected to an engine control unit (not shown), an accelerator (not shown), a steering control unit (not shown), a brake control unit (not shown), a transmission control unit (not shown), and the like. In one embodiment, the autonomous controller 108 may receive the opening TOC from the barrier TOC application 106 and may utilize the opening TOC to autonomously operate the vehicle 102 during an approach of the vehicle 102 towards the barrier 104. More specifically, the autonomous controller 108 may control the acceleration, braking, steering and/or other operations of the vehicle 102 to time the arrival of the vehicle 102 towards the barrier 104 to coincide with the barrier 104 being fully opened.

The ECU 110 may also be operably connected for computer communication to the head unit 112. The head unit 112 may include internal processing memory, an interface circuit, and bus lines (components of the head unit not shown) for transferring data, sending commands, and communicating with the components of the vehicle 102. In one embodiment, the ECU 110 and/or the head unit 112 may execute one or more operating systems, applications, and/or interfaces that are associated to the vehicle 102 and/or the plurality of vehicle systems 118. In particular, the head unit 112 may execute the barrier TOC application 106.

In one embodiment, the head unit 112 may be connected to the display unit 114 that may be disposed within a center stack area of the vehicle 102. The display unit 114 may display one or more vehicle human machine interfaces (vehicle HMI) to provide the driver of the vehicle 102 with various types of information and/or to receive one or more inputs from the driver of the vehicle 102. More specifically, the vehicle HMI may pertain to one or more operating systems, vehicle system interfaces, and application interfaces, including interfaces pertaining to the barrier TOC application 106. For example, the vehicle HMI may present one or more user interfaces of the barrier TOC application 106 including a barrier configuration user interface (not shown) and the countdown interface that includes the countdown notification.

In one or more embodiments, the head unit 112 may communicate with one or more additional display units (not shown) within the vehicle 102 that may include, but may not be limited to, a meter display and a head up display that may additionally or alternatively present the vehicle HMI. The head unit 112 may additionally be operably connected to one or more notification devices (not shown) within the vehicle 102. More particularly, the head unit 112 may communicate with one or more haptic devices (not shown) (e.g., haptic steering wheel, haptic seats, haptic gear shifter) audio devices (not shown) (e.g., audio system, speakers), etc. that may also be used to provide the countdown notification to the driver of the vehicle 102 in addition to or in lieu of the countdown interface.

In an exemplary embodiment, the vehicle 102 may additionally include a storage unit 116. The storage unit 116 may store one or more operating systems, applications, associated operating system data, application data, vehicle system and subsystem user interface data, and the like that are executed by the ECU 110 and/or the head unit 112. The storage unit 116 may include one or more barrier profiles that are respectively associated to one or more barriers based on user inputs. As discussed in more detail below, the barrier profile(s) may be created, populated and/or updated by the barrier TOC application 106.

The barrier profile may include details that are associated with the barrier 104 as identified by a user (e.g., the driver of the vehicle 102). The details may include a name assigned to the barrier 104 by the user (e.g., primary garage door), a geo-location associated with the barrier 104 (e.g., GPS, DGPS coordinates of the location of the barrier 104), a plurality of global positioning coordinates associated with boundaries of at least one geo-fence zone that is located within a predetermined vicinity of the barrier 104. The details may additionally include the opening TOC and the closing TOC that may be stored as respective time based values (e.g., 19.32 seconds). As discussed in more detail below, the barrier profile(s) may be created, populated, updated, and/or evaluated to retrieve data based on the execution of a learning mode and an execution mode of the barrier TOC application 106.

In an exemplary embodiment, the plurality of vehicle systems 118 may include, but may not be limited to, a vehicle communication system 122, a barrier control system 126, and a navigation system 130. In one embodiment, the vehicle communication system 122 may include one or more transceivers that are capable of providing wireless computer communications utilizing various protocols to be utilized to send/receive electronic signals internally to components and systems within the vehicle 102 and to external devices including a transceiver 128 operably connected to a barrier controller 124 associated with the barrier 104.

The vehicle communication system 122 may be capable of providing wired or wireless computer communications utilizing various protocols to send/receive non-transitory signals internally to the plurality of components of the vehicle 102 and/or externally to external devices. Generally, these protocols include a wireless system (e.g., IEEE 802.11, IEEE 802.15.1 (Bluetooth)), a near field communication system (NFC) (e.g., ISO 13157), a local area network (LAN), and/or a point-to-point system. The vehicle communication system 122 may be utilized by the barrier TOC application 106 to send and receive one or more radio frequency (RF) signals in one or more frequencies and/or radio bands to communicate and receive data to/from the barrier controller 124 through the transceiver 128. More particularly, the vehicle communication system 122 may communicate one or more data signals that include at least one barrier control signal to the barrier controller 124 to remotely control movement of the barrier 104. Additionally, the vehicle communication system 122 may receive one or more data signals that are sent from the barrier controller 124 to be interpreted by the barrier TOC application 106 and/or the barrier control system 126.

As discussed in more detail below, within the learning mode, the barrier TOC application 106 may utilize the vehicle communication system 122 to send one or more barrier learning data signals to the barrier controller 124. The barrier controller 124 may responsively actuate movement of the barrier 104 and may send a plurality of barrier movement response signals that indicate the (real-time) movement of the barrier 104. The application 106 may evaluate the plurality of movement response signals received from the barrier controller 124 by the vehicle communication system 122 to determine the movement of the barrier 104. In one embodiment, the one or more data signals received from the barrier controller 124 may be indicative of the opening of the barrier 104 and the closing of the barrier 104 that is timed based on the system clock of the ECU 110 to ultimately determine the opening TOC and the closing TOC.

The barrier TOC application 106 may additionally utilize the vehicle communication system 122 to send one or more status request data signals to be evaluated by the barrier controller 124. Upon evaluating the status request data signal(s), the barrier controller 124 may determine the current state of the barrier 104 as the opened state, a partially opened state, or the closed state. The barrier TOC application 106 may further utilize the vehicle communication system 122 to send the one or more barrier control signals to remotely control movement of the barrier 104 (e.g., actuate movement of the barrier 104 to open or close) based on the determination of the current state of the barrier 104 as determined and provided by the barrier controller 124.

In an exemplary embodiment, the barrier control system 126 of the vehicle 102 may be utilized to provide manual or automatic commands to the barrier controller 124 through the vehicle communication system 122. In particular, the barrier control system 126 may utilize the vehicle communication system 122 to send the one or more barrier control signals to actuate movement of the barrier 104 to open or close the barrier 104 based on one or more user inputs and/or one or more automated processes. In one configuration, the barrier control system 126 may be included as part of a HOMELINK® trainable garage door opening device (or other embedded, integrated accessory of the vehicle 102) that is integrated within a ceiling panel (not shown) or rearview mirror (not shown) of the vehicle 102. In some configurations, the barrier control system 126 may include one or more input buttons (not shown) that may be inputted by the user to actuate movement of the barrier 104. In some additional configurations, the barrier TOC application 106 may communicate with the barrier control system 126 to utilize the vehicle communication system 122 to send the one or more barrier control signals to traverse the barrier 104.

In an exemplary embodiment, the navigation system 130 may be connected to the head unit 112 and the display unit 114 to provide a map user interface (not shown) to the driver of the vehicle 102. The navigation system 130 may include a global position system 130b (GPS) that may also be used to localize (i.e., determine the GPS or DGPS coordinates) the vehicle 102. The navigation system 130 may include its own processor and memory that communicate with the GPS 130b to determine and provide route guidance to the driver of the vehicle 102.

In one or more embodiments, the navigation system 130 may include and/or connect to and access a map database 130a to present one or more details and graphics on the map user interface through the display unit 114. The map database 130a may include geographical maps of one or more locations (e.g., countries, regions, cities) in which the vehicle 102 may be driven. The map database 130a may also include locational data that pertains to the barrier 104. In one embodiment, the barrier TOC application 106 may utilize the navigation system 130 to localize the barrier 104 and to determine a plurality of global positioning coordinates associated with the area that is located within the surrounding area of the barrier 104. As discussed below, the plurality of global positioning coordinates associated with the areas may constitute as boundaries of one or more geo-fence zones that are determined to be within the predetermined vicinity of the barrier 104.

Referring now in more detail to the plurality of vehicle sensors 120, the plurality of vehicle sensors 120 may include the image sensors 132, RADAR/LADAR sensors 134, and vehicle dynamics sensors 136. In one embodiment, the image sensors 132 may include one or more external or internal cameras that may include, but may not be limited to, an infrared camera, a digital camera, a video camera (camera types not individually shown), and the like that may be mounted at one or more areas outside of and/or inside of the vehicle 102. For example, the image sensors 132 may include one or more infrared cameras (not shown) that may be mounted on a bumper (not shown), a dashboard (not shown) and/or the ceiling panel of the vehicle 102. In one or more embodiments, the image sensors 132 may provide a sequence of images/video that may pertain to an exterior environment of the vehicle 102. As discussed in more detail below, in one embodiment, the barrier TOC application 106 may communicate with the image sensors 132 to measure the duration of the movement of the barrier 104 to populate or update the opening TOC and/or the closing TOC within the barrier profile stored on the storage unit 116.

The RADAR/LADAR sensors 134 of the plurality of vehicle sensors 120 may include, but may not be limited to, a millimeter wave radar, a laser detection and range sensor, an infrared sensor, a thermal sensor, and the like. Various alternate or additional hardware devices will be apparent for inclusion as the RADAR/LADAR sensors 134. The RADAR/LADAR sensors 134 may be disposed at one or more areas of the vehicle 102 that may include a front bumper, door panels, vehicle mirrors, a rear bumper, a roof, a floorboard, (areas of the vehicle 102 not individually shown) and the like. In one embodiment, the RADAR/LADAR sensors 134 may provide the barrier TOC application 106 with data that pertains to the movement of the barrier 104 when the vehicle 102 is located within a sensing distance of the barrier 104. In particular, the barrier TOC application 106 may evaluate data provided by the RADAR/LADAR sensors 134 to measure the duration of the movement of the barrier 104 to populate or update the opening TOC and/or the closing TOC within the barrier profile stored on the storage unit 116.

In one or more embodiments, the vehicle dynamics sensors 136 may communicate with one or more components of the vehicle 102 that may include the ECU 110, an engine (not shown), a transmission (not shown), brakes (not shown), the plurality of vehicle systems 118, and the like to determine vehicle dynamics information. The vehicle dynamics information may be evaluated by the barrier TOC application 106 during the execution mode of the application 106 to evaluate vehicle speed, vehicle braking, vehicle steering, engine RPM, etc. In particular, such information may be evaluated to determine a point in time in which the barrier TOC application 106 is to present the countdown interface that includes a countdown notification once the vehicle 102 enters an inner geo-fence zone.

With particular reference to the barrier 104, in one or more embodiments, the barrier 104 may include a garage door, a gate (e.g., one or more gate doorways), a door (e.g., a residential door), etc. The barrier 104 may be connected to and controlled by the associated barrier controller 124. The barrier controller 124 may include internal processing memory, an interface circuit, and bus lines for transferring data, sending commands, and communicating with the components associated with and/or connected to the barrier 104. In one embodiment, the barrier controller 124 may be connected to a remote control (e.g., garage door remote) (not shown) and an interface device (e.g., wall inputs, numeric key pad) (not shown) that may be used by the user to provide one or more inputs to control movement of the barrier 104.

As discussed above, the barrier controller 124 may be operably connected to the transceiver 128. The barrier controller 124 may be configured to control operation of the transceiver 128 to receive one or more data or control signals from the vehicle communication system 122. Additionally, the barrier controller 124 may be configured to control operation of the transceiver 128 to send (e.g., transmit) one or more response signals to the vehicle communication system 122. In particular, the barrier controller 124 may evaluate the one or more data signals received by the transceiver 128 and may instruct the transceiver 128 to send the one or more response data signals. As discussed below, the one or more data signals sent by the vehicle communication system 122 may include the barrier learning data signal(s), status request data signal(s), and barrier control signal(s) that are sent based on the execution of the barrier TOC application 106. Additionally, the one or more response signals sent by the transceiver 128 may include the barrier movement response signal(s) and the current state data signal(s) based on the operation of the barrier controller 124.

The Barrier Toc Application and Related Methods

The components of the barrier TOC application 106 will now be described according to an exemplary embodiment and with reference to FIG. 1. In an exemplary embodiment, the barrier TOC application 106 may be stored on the storage unit 116 of the vehicle 102. In alternate embodiments, the barrier TOC application 106 may be stored on an externally hosted computing infrastructure (not shown) and may be accessed by the vehicle communication system 122 to be executed by the ECU 110 and/or the head unit 112 of the vehicle 102.

As discussed, the barrier TOC application 106 may be executed within at least two modes that may include, but are not limited to, the learning mode and the execution mode. In one embodiment, the barrier TOC application 106 may present the barrier configuration user interface that is presented to the user on the display unit 114. The barrier configuration user interface may allow the user to initiate the learning mode of the barrier TOC application 106. Once the learning mode of the application 106 is initiated, the user may select one or more respective user interface icons that execute the creation of a new barrier profile or the update of an existing barrier profile. The barrier configuration user interface may additionally allow the user to input the name assigned to the barrier 104, determine a geo-location of the barrier 104, and to measure the duration of the movement of the barrier 104 to determine the opening TOC and the closing TOC.

In an exemplary embodiment, the barrier TOC application 106 may include a zone determinant module 138, a barrier learning module 140, a barrier control module 142, and a barrier TOC module 144. It is to be appreciated that the barrier TOC application 106 may include additional modules and/or sub-modules that are configured to execute one or more functions of the application 106. Within the learning mode of the application 106, the barrier TOC application 106 may populate the barrier profile stored on the storage unit 116 and associated with the barrier 104.

In one embodiment, upon creation of the barrier profile, the zone determinant module 138 may communicate with the navigation system 130 of the vehicle 102 to determine the geo-location associated with the barrier 104. Upon determining the geo-location associated with the barrier 104, the zone determinant module 138 may additionally communicate with the navigation system 130 to determine the inner geo-fence zone that may be identified by a plurality of global positioning coordinates associated with the boundary of the inner geo-fence zone. Additionally, the zone determinant module 138 may communicate with the navigation system 130 to determine at least one outer geo-fence zone that is located within a predetermined vicinity of the barrier 104 and/or the inner geo-fence zone. The at least one outer geo-fence zone may be identified by a plurality of global positioning coordinates associated with the boundary of the at least one outer geo-fence zone.

In one embodiment, as the learning mode is enabled, the barrier learning module 140 may be utilized to measure the duration of the movement of the barrier 104 with respect to the barrier 104 traversing from the closed state to the opened state and/or the opened state to the closed state. As discussed below, upon measuring the duration of the movement of the barrier 104, the barrier learning module 140 may populate the barrier profile with the opening TOC and/or the closing TOC.

In an exemplary embodiment, upon creation of the barrier profile, the barrier TOC application 106 may be executed in the execution mode based on the enablement of the vehicle 102 (e.g., enabling of an ignition of the vehicle 102 in an ACC or engine ON mode). As discussed in more detail below, during the execution mode, the barrier control module 142 may determine the current state (e.g., opened state, partially opened state, closed state) of the barrier 104. Upon determining the current state of the barrier 104, the barrier control module 142 may utilize the vehicle communication system 122 to send the barrier control signal(s) in order for the barrier controller 124 to traverse the barrier 104 to be opened or closed based on the current state of the barrier 104.

As explained below, the barrier TOC module 144 may present the countdown interface that includes the countdown notification. The countdown notification may present the measured duration of the movement of the barrier 104 in a countdown format. Methods related to one or more processes that are executed by the modules 130-134 of the barrier TOC application 106 will now be described in more detail below.

Figure 2:
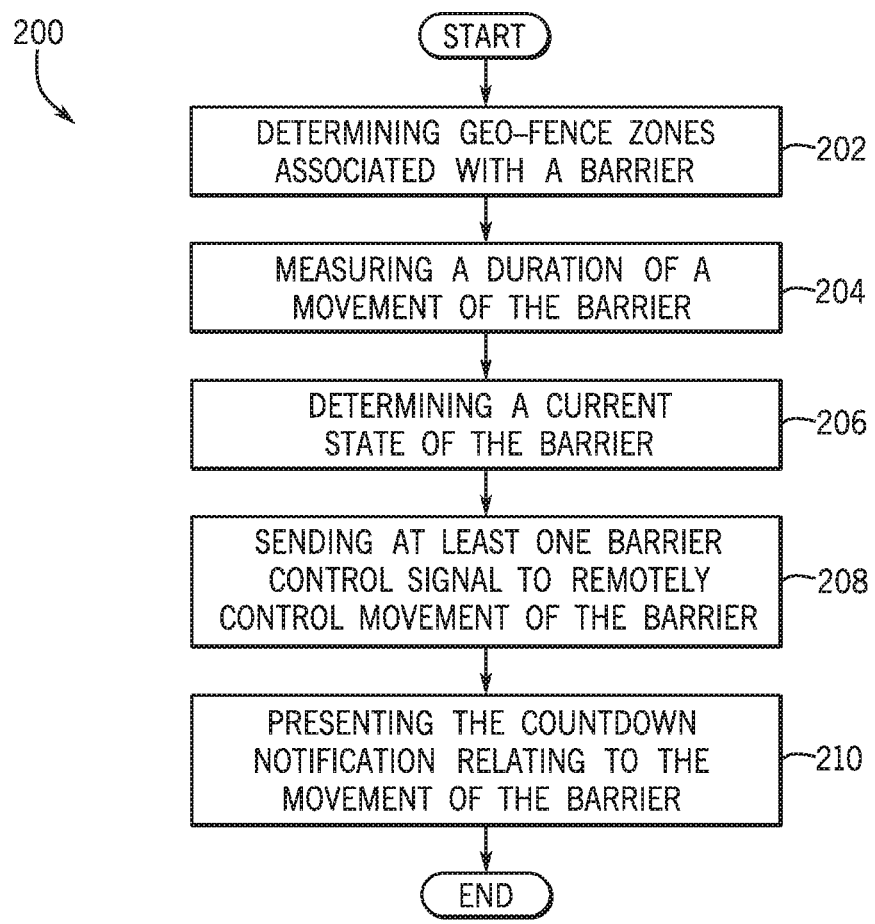
FIG. 2 is a process flow diagram of a method for providing a countdown notification relating to a movement of a barrier according to an exemplary embodiment.

FIG. 2 is a process flow diagram of a method 200 for providing a countdown notification relating to a movement of a barrier 104 according to an exemplary embodiment. FIG. 2 will be described with reference to the components of FIG. 1, though it is to be appreciated that the method of FIG. 2 may be used with other systems/components. The method 200 may begin at block 202, wherein the method 200 may include determining geo-fence zones associated with a barrier 104.

Figure 3A:
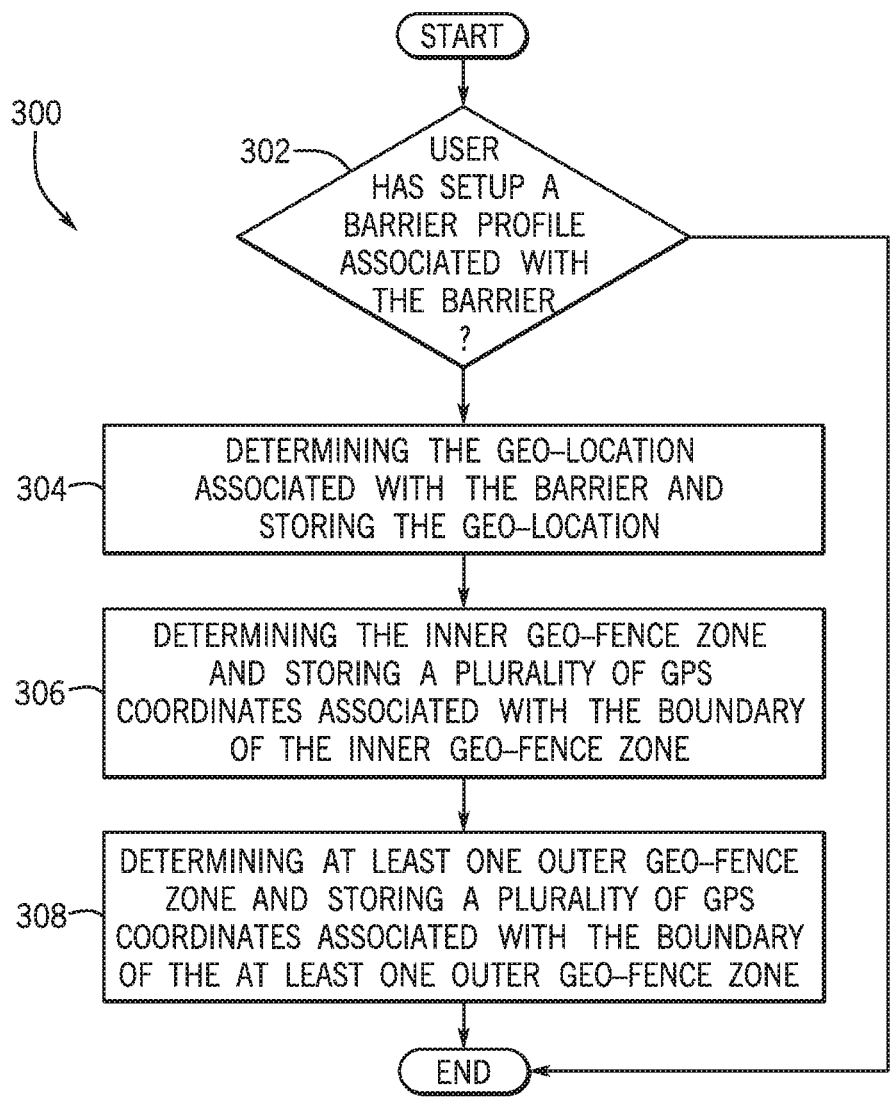
FIG. 3A is a process flow diagram of a method for determining geo-fence zones associated with the barrier within a learning mode of a barrier TOC application according to an exemplary embodiment.

Block 202 will be discussed in more detail with respect to FIG. 3A, a process flow diagram of a method 300 for determining geo-fence zones associated with the barrier 104 within the learning mode of the barrier TOC application 106 according to an exemplary embodiment. FIG. 3A will be described with reference to the components of FIG. 1 though it is to be appreciated that the method of FIG. 3A may be used with other systems and/or components. The method 300 may begin at block 302, wherein the method 300 may include determining if the user has setup a barrier profile associated with the barrier 104. As discussed above, the barrier configuration user interface may allow the user to initiate the learning mode of the barrier TOC application 106.

Once the learning mode is initiated, the user may select a respective user interface icon that executes the creation of the barrier profile associated with the barrier 104. For example, the driver of the vehicle 102 may wish to create the barrier profile that is associated to the barrier 104 (e.g., garage door) located at the driver's home to enable the application 106 to communicate with the barrier controller 124 (e.g., garage door opener) associated with the barrier 104 and provide the countdown notification accordingly. Once the user selects the respective user interface icon and inputs the name assigned to the barrier 104 per the user's choosing, the barrier TOC application 106 may store the barrier profile on the storage unit 116 of the vehicle 102. Upon storing the barrier profile on the storage unit 116, a respective indication may be communicated to the zone determinant module 138 indicating that the user has setup the barrier profile associated with the barrier 104.

If it is determined that the user has setup the barrier profile associated with the barrier 104 (at block 302), the method 300 may proceed to block 304, wherein the method 300 may include determining the geo-location of the barrier 104 and storing the geo-location. In an exemplary embodiment, upon receiving the indication that the user has setup the barrier profile associated with the barrier 104, the zone determinant module 138 may present a barrier location determination user interface (not shown) to the user. The barrier location determination user interface may be utilized by the user to actuate the determination of the geo-location of the barrier 104 when the vehicle 102 is located within a predetermined distance of the barrier 104 (e.g. 10 yards). More specifically, the barrier location determination user interface may include a user interface object(s) that may be inputted by the user to indicate that the vehicle 102 is within the predetermined distance of the barrier 104 to enable the zone determinant module 138 to determine the geo-location of the barrier 104. As discussed below, the stored geo-location may be used by the application 106 to determine one or more geo-fence zones and/or areas surrounding the barrier 104.

In one embodiment, the zone determinant module 138 may communicate with the navigation system 130 of the vehicle 102 to determine the geo-location of the barrier 104. The navigation system 130 may access the GPS 130*b* to determine locational coordinates associated with the location of the vehicle 102. In one embodiment, the navigation system 130 may further access the map database 130*a* to determine if a highlighted location that may include a dwelling/building that includes the barrier 104 is located within a predetermined proximity of the vehicle 102 (i.e., of the locational coordinates associated with the location of the vehicle 102 as determined by the GPS 130*b*). The highlighted location may be indicative of a home location saved by the user via the map user interface, a point of interest presented on the map interface, and/or a physical address that is included within the map database 130a.

In one embodiment, when the map database 130a communicates that the highlighted location is located within the predetermined proximity of the vehicle 102, the zone determinant module 138 may ask the user (via the barrier location determination user interface) if the user wishes to interpret the highlighted location as the geo-location associated with the barrier 104. If the user does wish to interpret the highlighted location as the geo-location associated with the barrier 104, the zone determinant module 138 may access the barrier profile and populate the locational coordinates associated with the highlighted location as the geo-location associated with the barrier 104.

In an alternate embodiment, upon determining locational coordinates associated with the location of the vehicle 102, the navigation system 130 may communicate with the image sensors 132 and/or the RADAR/LADAR sensors 134 to determine the specific location of the barrier 104 sensed by the sensors 132, 134. Upon determining the specific location of the barrier 104, the zone determinant module 138 may communicate with the navigation system 130 to determine the locational coordinates associated with the barrier 104. The zone determinant module 138 may access the barrier profile stored on the storage unit 116 and may populate the locational coordinates as the geo-location associated with the barrier 104.

In an additional embodiment, the user may utilize the map user interface of the navigation system 130 to input a saved location that may be utilized by the application 106 as the location of the barrier 104. For example, the user may input a home location as a saved location on the map user interface. The user may additionally utilize the barrier configuration user interface to input the saved location as the location of the barrier 104. The zone determinant module 138 may communicate with the navigation system 130 to determine the geo-location of the barrier 104 based on the saved location. The zone determinant module 138 may further access the barrier profile stored on the storage unit 116 and may populate the locational coordinates associated with the saved location as the geo-location associated with the barrier 104.

With continued reference to the method 300 of FIG. 3, the method 300 may proceed to block 306, wherein the method 300 may include determining the inner geo-fence zone and storing a plurality of GPS coordinates associated with the boundary of the inner geo-fence zone. In an exemplary embodiment, upon determining the geo-location associated with the barrier 104 (as discussed with respect to block 304), the zone determinant module 138 may determine the inner geo-fence by communicating with the navigation system 130 to determine an area that is located in a first proximity of the barrier 104 to indicate a boundary of the inner geo-fence zone.

Figure 3B:
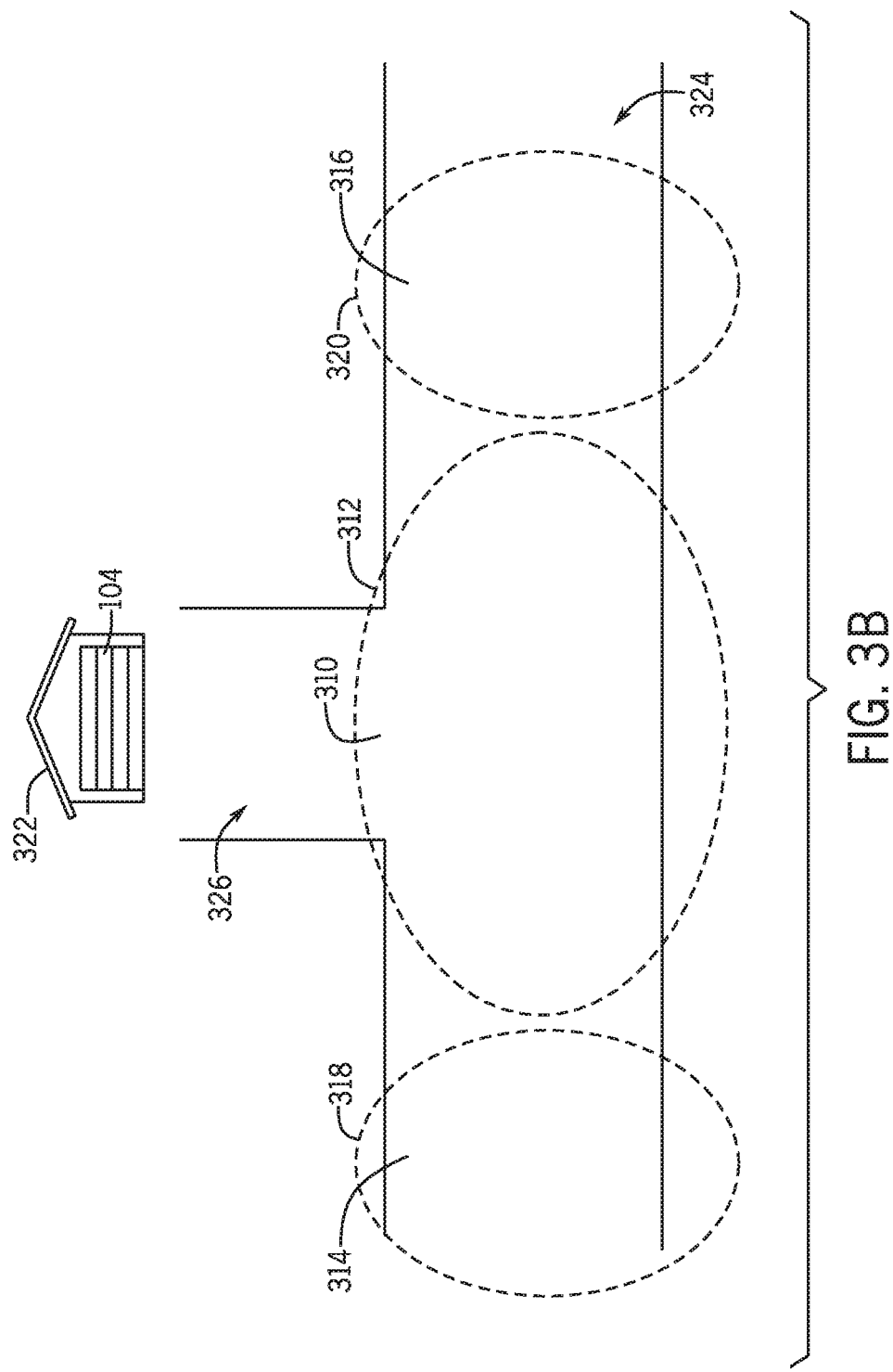
FIG. 3B is an illustrative example of an inner geo-fence zone and at least one outer geo-fence zone as determined by the barrier TOC application according to an exemplary embodiment.

As shown in the illustrative example of FIG. 3B, the inner geo-fence zone 310 may include the area that is located in the first proximity of the barrier 104. In other words, the inner geo-fence zone 310 may include a first area that is surrounding the geo-location of the barrier 104. In one embodiment, the size (e.g., dimensions) of the inner geo-fence zone 310 may be based on the surrounding environment the barrier 104 as determined based on data pertaining to one or more streets, driveways, and surrounding structures/objects provided by the map database 130a. In particular, data pertaining to the surrounding environment of the barrier 104 as provided from the map database 130a may be communicated by the navigation system 130 to the zone determinant module 138 based on the geo-location of the barrier 104.

The zone determinant module 138 may analyze the data pertaining to the surrounding environment of the vehicle 102 and may determine the size of the inner geo-fence zone 310 according to one or more environmental variables. The one or more environmental variables may include, but are not limited to, the length of the street(s) 324 within a vicinity of the barrier 104, the length of the driveway(s) 326 leading up to the barrier 104, the location of the surrounding structures/object(s) within the vicinity of the barrier 104, and the like. In particular, the zone determinant module 138 may determine the size of the inner geo-fence zone to ensure that one or more command data signals may be transmitted to the transceiver 128 at a time that the vehicle 102 is at a requisite distance from the barrier 104. This functionality may ensure that the barrier control signal(s) are sent at an appropriate time to fully open the barrier 104 upon the arrival of the vehicle 102 towards the barrier 104 or to fully close the barrier 104 upon the departure of the vehicle 102 away from the barrier 104 without compromising the security of contents located behind the barrier 104. For example, in a scenario where the barrier 104 is located at an end of a short driveway 326, the inner geo-fence zone 310 may include a smaller area surrounding the barrier 104 than in a scenario where the barrier 104 is located at an end of a long driveway 326.

In an exemplary embodiment, upon determining the size of the inner geo-fence zone 310, the zone determinant module 138 may communicate with the navigation system 130 to determine the plurality of GPS coordinates (e.g., latitude x, longitude y) of the areas that include the boundary 312 of the inner geo-fence zone 310. The navigation system 130 may utilize the GPS 130b to determine the plurality of GPS coordinates associated with portions of the boundary 312 of the inner geo-fence zone 310. Upon determining the plurality of GPS coordinates associated with the portions of the boundary 312, the navigation system 130 may communicate the plurality of GPS coordinates to the zone determinant module 138. The zone determinant module 138 may access the barrier profile associated with the barrier 104 stored on the storage unit 116 and may populate the plurality of GPS coordinates associated with portions of the boundary 312 of the inner geo-fence zone 310. As discussed below, during the execution mode of the barrier TOC application 106, the plurality of GPS coordinates populated within the barrier profile may be evaluated in order to send the barrier control signal(s) to the barrier controller 124 to traverse the barrier 104.

Referring again to FIG. 3A, the method 300 may proceed to block 308, wherein the method 300 may include determining at least one outer geo-fence zone and storing a plurality of GPS coordinates associated with the boundary of the at least one outer geo-fence zone. In an exemplary embodiment, upon determining the inner geo-fence zone 310 and storing the plurality of GPS coordinates associated with the boundary 312 (as discussed with respect to block 306), the zone determinant module 138 may determine the at least one outer geo-fence zone by communicating signal(s) to the navigation system 130 to determine at least one area that is located within at least a second surrounding area of the barrier 104 to indicate a boundary of the at least one outer geo-fence zone.

In one embodiment, the navigation system 130 may communicate map data determined from the map database 130a that pertains to the surrounding environment of the barrier 104 to the zone determinant module 138. The zone determinant module 138 may evaluate the map data to determine the street(s) 324 or portions of the street(s) 324 that may be located at one or more predetermined distances outside of the inner geo-fence zone 310. The zone determinant module 138 may determine the street(s) 324 that the vehicle 102 may be driven on to arrive or depart from the barrier 104 and may determine a number of outer geo-fence zones based on the map data pertaining to the one or more environmental variables discussed above.

With reference again to the illustrative example of FIG. 3B, the zone determinant module 138 may determine two outer geo-fence zones 314, 316 that are located a predetermined distance(s) outside of the inner geo-fence zone 310. More specifically, the outer geo-fence zones 314, 316 may include a second and third area located outside of the inner geo-fence zone 310. In one embodiment, the size (e.g., dimensions) of the outer geo-fence zones 314, 316 may be based on the surrounding environment the barrier 104 as determined based on data provided by the map database 130a and/or the size of the inner geo-fence zone 310.

In one embodiment, the zone determinant module 138 may analyze the data pertaining to the surrounding environment of the vehicle 102 and may also determine the size of the outer geo-fence zones 314, 316 according to the one or more environmental variables discussed above. In particular, the zone determinant module 138 may determine the size of the outer geo-fence zones 314, 316 to ensure that one or more status request data signals may be transmitted to the transceiver 128 at a time that the vehicle 102 is outside of the inner geo-fence zone 310 as the vehicle 102 is arriving toward the barrier 104. This functionality may ensure that the application 106 is aware of the current state of the barrier 104 to send the appropriate barrier control signal(s) to fully open the barrier 104 upon the arrival of the vehicle 102 towards the barrier 104.

In an exemplary embodiment, upon determining the sizes of the outer geo-fence zones 314, 316, the zone determinant module 138 may communicate with the navigation system 130 to determine the plurality of GPS coordinates of the areas that include the respective boundaries 318, 320 of the outer geo-fence zones 314, 316. The navigation system 130 may utilize the GPS 130b to determine the plurality of GPS coordinates (e.g., latitude x, longitude y) associated with portions of the boundaries 318, 320 of the outer geo-fence zones 314, 316. Upon determining the plurality of GPS coordinates associated with the one or more of the portions of the boundaries 318, 320, the navigation system 130 may communicate the plurality of GPS coordinates to the zone determinant module 138.

Upon receiving the plurality of GPS coordinates, the zone determinant module 138 may access the barrier profile associated with the barrier 104 stored on the storage unit 116 and may populate the plurality of GPS coordinates associated with portions of the boundaries 318, 320 of the outer geo-fence zones 314, 316. As discussed below, during the execution mode of the barrier TOC application 106, the plurality of GPS coordinates populated within the barrier profile associated with the outer geo-fence zones 314, 316 may be evaluated in order to send the status request data signals to the barrier controller 124 to determine the current state (e.g., opened state, closed state) of the barrier 104 when the vehicle 102 is arriving towards the barrier 104.

Figure 4A:
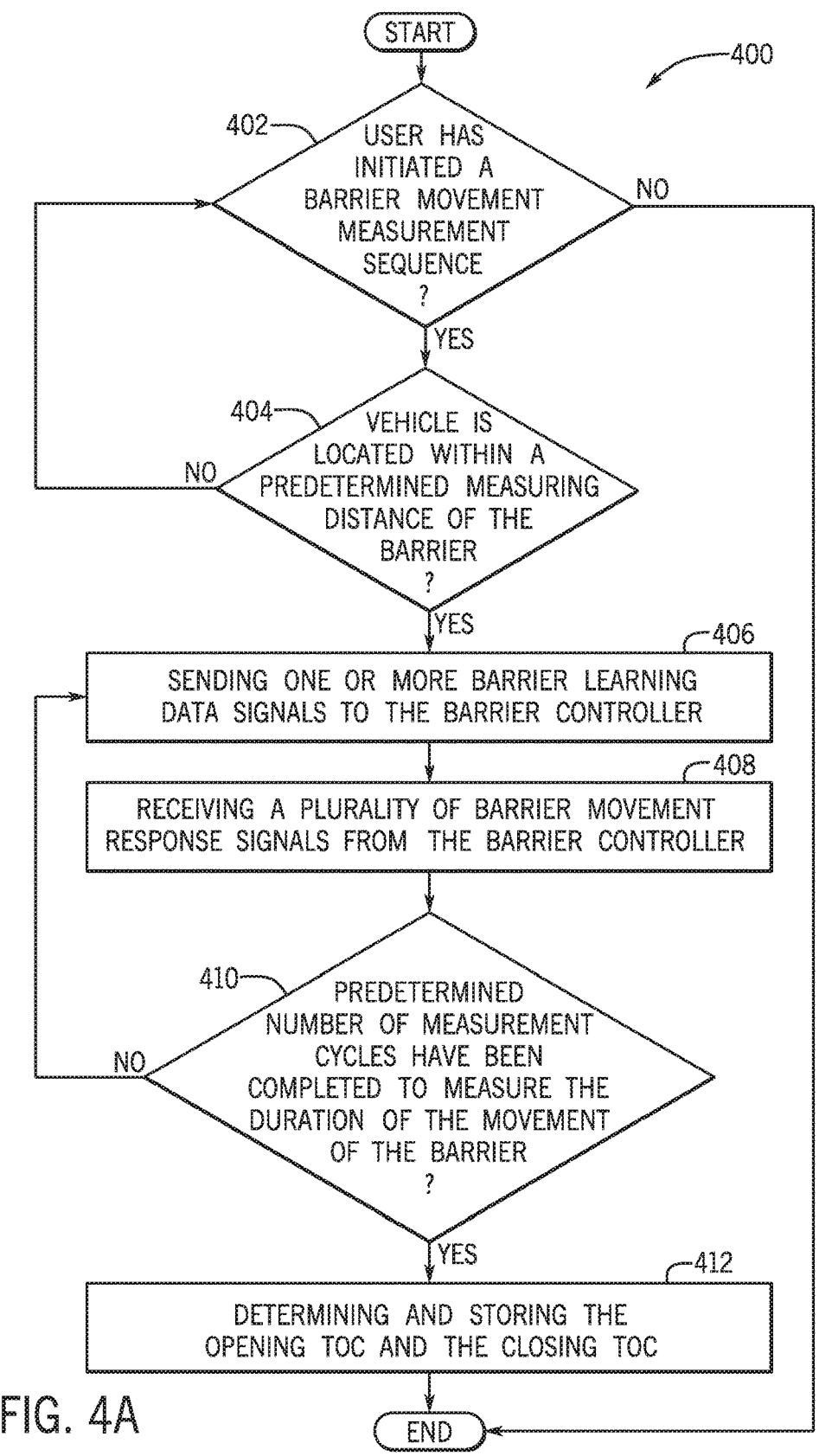
FIG. 4A is a process flow diagram of a method for measuring a duration of a movement of the barrier within the learning mode of the barrier TOC application according to an exemplary embodiment.

With reference again to the method 200 of FIG. 2, upon determining geo-fence zones associated with the barrier 104 (at block 202), the method 200 may proceed to block 204, wherein the method 200 may include measuring a duration of a movement of the barrier 104. Block 204 will be discussed in more detail with respect to FIG. 4A, a process flow diagram of a method 400 for measuring the duration of a movement of the barrier 104 within the learning mode of the barrier TOC application 106 according to an exemplary embodiment. FIG. 4A will be described with reference to the components of FIG. 1 and FIG. 4B though it is to be appreciated that the method of FIG. 4A may be used with other systems and/or components.

The method 400 may begin at block 402, wherein the method 400 may include determining if the user has initiated a barrier movement measurement sequence. In one embodiment, the barrier configuration user interface presented via the display unit 114 may permit the user to input a barrier measurement user input object associated to the barrier 104 (e.g., by the name assigned to the barrier 104) to start the barrier movement measurement sequence within the learning mode of the application 106. The barrier movement measurement sequence may be initiated to measure and store the opening TOC and the closing TOC (i.e., the time of completion to traverse the barrier 104 from the closed state to the opened state and the time of completion to traverse the barrier 104 from the opened state to the closed state). Upon the user inputting the barrier measurement user input object, the barrier learning module 140 may initiate the barrier movement measurement sequence within the learning mode of the barrier TOC application 106.

If it is determined that the user has initiated the barrier movement measurement sequence (at block 402), the method 400 may proceed to block 404, wherein the method 400 may include determining if the vehicle 102 is located within a predetermined measuring distance of the barrier 104. In an exemplary embodiment, the barrier learning module 140 may classify the predetermined measuring distance as a distance required for the transceiver 128 to receive the barrier learning data signal(s) that are evaluated by the barrier controller. Additionally, the barrier learning module 140 may classify the predetermined measuring distance as a distance required for the vehicle communication system 122 to receive the plurality of barrier movement response signals from the transceiver 128 based on the operation of the barrier controller 124. In an additional embodiment, the barrier learning module 140 may additionally or alternatively classify the predetermined measuring distance as the sensing distance required by the image sensors 132 and/or the RADAR/LADAR sensors 134 to sense the presence and movement of the barrier 104.

In one embodiment, upon the actuation of the barrier movement measurement sequence, the barrier learning module 140 may communicate with the navigation system 130 to determine if the vehicle 102 is within the predetermined measuring distance of the barrier 104. More specifically, the navigation system 130 may communicate the GPS coordinates of the location of the vehicle 102 to the barrier learning module 140 as determined by the GPS 130b. Upon receiving the GPS coordinates of the location of the vehicle 102, the barrier learning module 140 may access the barrier profile stored on the storage unit 116 to retrieve the geo-location associated with the barrier 104. The barrier learning module 140 may further compare the GPS coordinates of the location of the vehicle 102 with the geo-location associated with the barrier 104 to determine if the vehicle 102 is located within the predetermined measuring distance of the barrier 104.

In another embodiment, the barrier learning module 140 may communicate with the image sensors 132 and/or the RADAR/LADAR sensors 134 to determine if the vehicle 102 is within the predetermined measuring distance of the barrier 104. More specifically, within this embodiment, the barrier learning module 140 may equate the sensing distance of the barrier 104 as the predetermined measuring distance. As such, the barrier learning module 140 may communicate with the image sensors 132 and/or the RADAR/LADAR sensors 134 to determine if the presence and/or movement of the barrier 104 may be sensed based on the current location of the vehicle 102. If the image sensors 132 and/or the RADAR/LADAR sensors 134 determine the presence and/or movement of the barrier 104 may be sensed based on the current location of the vehicle 102, the sensors 132, 134 may communicate with the barrier learning module 140 to determine that the vehicle 102 is located within the sensing distance. Consequently, the barrier learning module 140 may determine that the vehicle 102 is located within the predetermined measuring distance of the barrier 104.

If it is determined that the vehicle 102 is located within the predetermined measuring distance of the barrier 104 (at block 404), the method 400 may proceed to block 406, wherein the method 400 may include sending one or more barrier learning data signals to the barrier controller 124. In particular, the barrier learning module 140 may utilize the vehicle communication system 122 to send (e.g., transmit) the one or more barrier learning data signals to the transceiver 128 to be interpreted by the barrier controller 124. In one embodiment, the barrier learning data signal(s) may indicate that the barrier controller 124 should start a barrier measurement cycle. Upon interpreting the barrier learning data signal(s), the barrier controller 124 may start the barrier measurement cycle and may actuate movement of the barrier 104. For instance, if the barrier 104 is in the closed state, the barrier controller 124 may actuate movement of the barrier 104 to traverse the barrier 104 from the closed state to the opened state. The barrier controller 124 may additionally actuate movement of the barrier 104 to traverse from the opened state back to the closed state. Similarly, if the barrier 104 is in the opened state, the barrier controller 124 may actuate movement of the barrier 104 to traverse the barrier 104 from the opened state to the closed state. The barrier controller 124 may additionally actuate movement of the barrier 104 to traverse from the closed state back to the opened state. In other words, the barrier controller 124 actuates movement of the barrier 104 such that the barrier 104 traverses in both opening and closing directions in order to measure the duration of the movement of the barrier 104 in both directions.

With continued reference to FIG. 4A, the method 400 may proceed to block 408, wherein the method 400 may include receiving a plurality of movement response signals from the barrier controller 124. Upon actuating movement of the barrier 104, the barrier controller 124 may utilize the transceiver 128 to send the plurality of barrier movement response signals that indicate the (real-time) opening or closing movement of the barrier 104. Additionally, each of the plurality of barrier movement response signals may additionally include a barrier traversing level that indicates an opening/closing level of the barrier 104 as it is being traversed from one state to another.

FIG. 4B is an illustrative example of the barrier 104 that is configured as a garage door and a barrier controller 124 that is configured as a garage door opener according to an exemplary embodiment. The barrier controller 124 may include a motor 414 that is operably connected to a cable 416 that is connected to a trolley/pulley 418. As shown, the trolley/pulley 418 may be connected to the barrier 104 by a tension spring 420 that is connected to the trolley/pulley 418 by an arm 422. The operation of the motor 414 may move the cable 416 across a track 424 such that the trolley/pulley 418 may be traversed from a first position, designated as 'Position A', wherein the barrier 104 is in the closed state, to a second position, designated as 'Position B', wherein the barrier 104 is in the opened state. In other words, based on the operation of the motor 414, the barrier 104 may be traversed from the closed position to the opened position, wherein the trolley/pulley 418 is traversed from 'Position A' to 'Position B'. Similarly, based on the operation of the motor 414, the barrier 104 may be traversed from the opened position to the closed position, wherein the trolley/pulley 418 is traversed from 'Position B' to 'Position A'.

In an exemplary embodiment, the barrier controller 124 may utilize the transceiver 128 to send the plurality of barrier movement response signals as the motor 414 is moving the cable 416 to traverse the trolley/pulley 418 from the first position to the second position and/or from the second position to the first position. As discussed above, the plurality of barrier movement response signals may each include the respective barrier traversing level that indicates the opening/closing level of the barrier 104. The barrier traversing level may be representative of the position of the cable 416 as its being moved by the operation of the motor 414 and/or the position of the trolley/pulley 418 as its being moved across the track 424 based on the movement of the cable 416.

In one embodiment, as the motor 414 is operated to move the cable 416 to traverse the trolley/pulley 418, the transceiver 128 may send the plurality of barrier movement response signals at a predetermined frequency to the vehicle communication system 122. More specifically, the transceiver 128 may send the plurality of barrier movement response signals upon the starting point of the movement of the cable 416 when the barrier 104 starts traversing across the track 424 to an ending point of the movement of the cable 416 when the barrier 104 completes traversing across the track 424. It is to be appreciated that the functionality of the motor 414 may be applied to alternate configurations of the barrier 104 other than the garage door. In one exemplary configuration, the barrier 104 may be configured as a two-door gate (not shown) that may include latches that are operably connected to one or more motors (not shown) of the barrier controller 124. In this exemplary configuration, the plurality of barrier movement response signals may be indicative of the movement of the latches by the one or more motors.

In an exemplary embodiment, upon the vehicle communication system 122 receiving the plurality of barrier movement response signals from the transceiver 128, the barrier learning module 140 may evaluate the plurality of movement response signals to determine the real-time movement of the barrier 104. In one embodiment, the barrier learning module 140 may evaluate the plurality of barrier movement response signals to determine if the barrier 104 is being traversed from the opened state to the closed state or from the closed state to the opened state. The barrier learning module 140 may additionally communicate with the ECU 110 to utilize the system clock to measure the duration of the movement of the barrier 104 based on a calculation of the duration of time that the plurality of barrier movement response signals are received by the vehicle communication system 122. The barrier learning module 140 may store the measured duration of the movement of the barrier 104 as an opening measured duration and a closed measured duration (based on the determination that the barrier 104 is being traversed from the closed state or the opened state).

With reference again to the method 400 of FIG. 4A, the method 400 may proceed to block 410, wherein the method 400 may include determining if a predetermined number of measurement cycles have been completed to measure the duration of the movement of the barrier 104. In one embodiment, the barrier learning module 140 may be configured to require a predetermined number of measurement cycles to have been completed to accurately measure the duration of the movement of the barrier 104. If it is determined that the predetermined number of measurement cycles have not been completed to measure the duration of the movement of the barrier 104 (at block 410), the method 400 may proceed back to block 406, wherein the method 400 may again include sending the one or more barrier learning data signals to the barrier controller 124.

If it is determined that the predetermined number of measurement cycles have been completed to measure the duration of the movement of the barrier 104 (at block 410), the method 400 may proceed to block 412, wherein the method 400 may include determining and storing the opening TOC and the closing TOC. In an exemplary embodiment, upon completing the predetermined number of measurement cycles the barrier learning module 140 may access the storage unit 116 to acquire one or more previously stored opening measured durations and one or more previously stored closing measured durations (based on previous iterations of blocks 406 and 408). Upon acquiring the one or more previously stored opening measured durations, the barrier learning module 140 may compare a most recently determined opening measured duration against one or more previously determined opening measured durations stored on the storage unit 116. The barrier learning module 140 may further evaluate the durations and may determine the opening TOC based on an aggregation of the opening measured durations that fall within a predetermined margin of error.

Additionally, upon acquiring the one or more previously stored closing measured durations, the barrier learning module 140 may compare a most recently determined closing measured duration against one or more previously determined closing measured durations stored on the storage unit 116. The barrier learning module 140 may further evaluate the durations and may determine the closing TOC based on an aggregation of the closing measured durations that fall within a predetermined margin of error. Upon determining the opening TOC and the closing TOC, the barrier learning module 140 may access the barrier profile associated with the barrier 104 on the storage unit 116 and may populate the barrier profile with the opening TOC and the closing TOC. As discussed below, the opening TOC and/or the closing TOC populated on the barrier profile may be utilized by the barrier TOC module 144 upon the barrier control module 142 sending the barrier control signal(s) to the barrier controller 124 to remotely open or close the barrier 104.

In an alternate embodiment, the barrier learning module 140 may utilize data provided by the image sensors 132 and/or the RADAR/LADAR sensors 134 to determine the opening and closing TOC. More specifically, the barrier learning module 140 may communicate with the image sensors 132 and/or the RADAR/LADAR sensors 134 to determine if the vehicle 102 is within the sensing distance of the barrier 104. Upon determining that the vehicle 102 is within the sensing distance of the barrier 104, the barrier learning module 140 may send the barrier learning data signal(s) to the barrier controller 124 to initiate the barrier measurement cycle(s) in order for the barrier controller 124 to actuate movement of the barrier 104 in both the opening and closing directions. The image sensors 132 and/or the RADAR/LADAR sensors 134 may be configured to sense the movement and the direction of movement of the barrier 104 and send a plurality of barrier movement sensing signals that may indicate the movement of the barrier 104 and the direction of movement of the barrier 104 to the barrier learning module 140.

In one embodiment, the barrier learning module 140 may evaluate the plurality of barrier movement sensing signals to determine if the barrier 104 is being traversed from the opened state to the closed state or from the closed state to the opened state. The barrier learning module 140 may additionally communicate with the ECU 110 to utilize the system clock to measure the duration of the movement of the barrier 104 based on a calculation of the duration of time that the plurality of barrier movement sensing signals are received by the vehicle communication system 122. The barrier learning module 140 may access the barrier profile associated with the barrier 104 on the storage unit 116 and may populate the barrier profile with the opening TOC and the closing TOC based on the calculated duration of the time that the plurality of barrier movement sensing signals are received during the respective opening and closing of the barrier 104.

In an exemplary embodiment, upon the barrier learning module 140 populating the barrier profile with the opening TOC and the closing TOC (as discussed above with respect to block 412 of the method 400), the barrier learning module 140 may send a respective signal to the barrier control module 142 to indicate the determination of the opening TOC and the closing TOC. The barrier control module 142 may responsively initiate the execution mode of the barrier TOC application 106.

Figure 5:
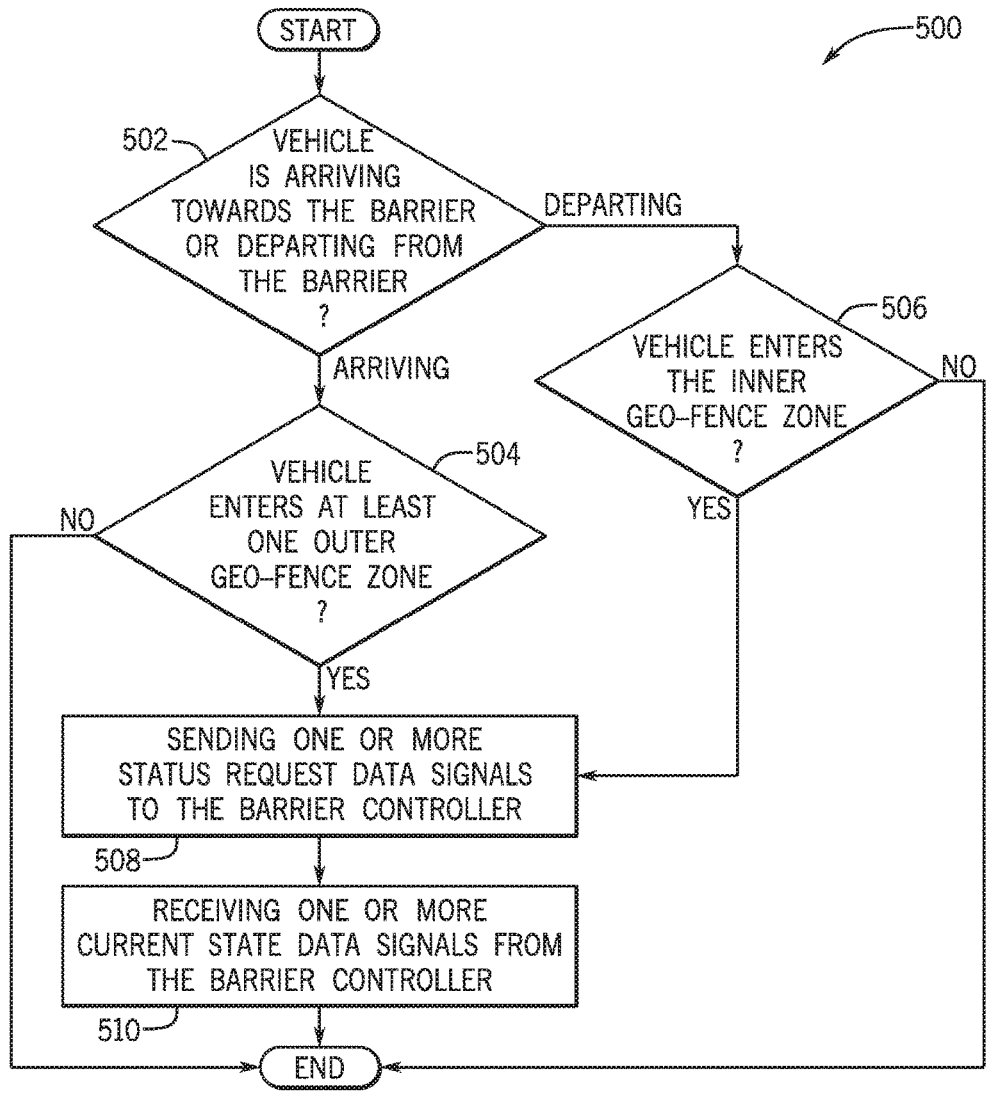
FIG. 5 is a process flow diagram of a method for determining the current state of the barrier within an execution mode of the barrier TOC application according to an exemplary embodiment.

With reference again to the method 200 of FIG. 2, upon measuring the duration of the movement of the barrier 104 (at block 204), the method 200 may proceed to block 206, wherein the method 200 may include determining a current state of the barrier 104. Block 206 will be discussed in more detail with respect to FIG. 5, a process flow diagram of a method 500 for determining the current state of the barrier 104 within the execution mode of the barrier TOC application 106 according to an exemplary embodiment. FIG. 5 will be described with reference to the components of FIG. 1 though it is to be appreciated that the method of FIG. 5 may be used with other systems and/or components.

The method 500 may begin at block 502, wherein the method 500 may include determining if the vehicle 102 is arriving towards the barrier 104 or departing away from the barrier 104. In one embodiment, as the vehicle 102 is being driven the barrier control module 142 may communicate with the navigation system 130 to continually determine the locational coordinates associated with the (location of the) vehicle 102 as provided by the GPS 130*b*. The barrier control module 142 may also access the barrier profile stored on the storage unit 116 to retrieve the geo-location associated with the barrier 104. Upon retrieving the geo-location associated with the barrier 104, the barrier control module 142 may communicate with the navigation system 130 to determine if the vehicle 102 is within a predetermined distance (e.g., within a 1 mile radius) of the geo-location associated with the barrier 104. If the navigation system 130 determines that the vehicle 102 is within the predetermined distance of the geo-location associated with the barrier 104, the navigation system 130 may further utilize the map database 130*a* and the GPS 130*b* to evaluate if the vehicle 102 is being driven towards the barrier 104 or away from the barrier 104. The navigation system 130 may communicate the results of the evaluation to the barrier control module 142 and the module 142 may respectively determine if the vehicle 102 is arriving towards the barrier 104 or the vehicle 102 is departing away from the barrier 104.

If it is determined that the vehicle 102 is arriving towards the barrier 104 (at block 502), the method 500 may proceed to block 504, wherein the method 500 may include determining if the vehicle 102 enters the at least one outer geo-fence zone. As discussed above, within the learning mode, the zone determinant module 138 may populate the barrier profile associated with the barrier 104 with the plurality of GPS coordinates associated with portions of the boundaries 318, 320 of the outer geo-fence zones, as illustrated in FIG. 3B. In one embodiment, as the vehicle 102 is being driven, the barrier control module 142 may communicate with the navigation system 130 to continually determine the locational coordinates associated with the vehicle 102 as provided by the GPS 130b.

The barrier control module 142 may also access the barrier profile stored on the storage unit 116 and may communicate with the navigation system 130 to determine if the vehicle 102 is entering any of the portions of the boundaries 318, 320 based on the populated plurality of GPS coordinates of the portions of the boundaries 318, 320. More specifically, the barrier control module 142 may continually compare the locational coordinates of the vehicle 102 against the plurality of GPS coordinates associated with portions of the boundaries 318, 320 to determine if they overlap with one another. If it is determined that the overlapping of the locational coordinates of the vehicle 102 occurs with the plurality of GPS coordinates associated with portions of the boundaries 318, 320, the barrier control module 142 may determine that the vehicle 102 enters at least one of the outer geo-fence zones 314, 316. For example, with reference to FIG. 3B, if the vehicle 102 is being driven towards a garage 322, the vehicle 102 may enter one of the outer geo-fence zones 314, 316, as the vehicle 102 is driving down the street 324 towards the garage 322. In such a scenario, the barrier control module 142 may determine when the vehicle 102 enters the inner geo-fence zone 310 once the vehicle 102 crosses one of the portions of the boundaries 318, 320.

If it is determined that the vehicle 102 is departing away from the barrier 104 (at block 502), the method 500 may proceed to block 506, wherein the method 500 may include determining if the vehicle 102 enters the inner geo-fence zone. As discussed above, within the learning mode, the zone determinant module 138 may populate the barrier profile associated with the barrier 104 with the plurality of GPS coordinates associated with portions of the boundary 312 of the inner geo-fence zone 310, as illustrated in FIG. 3B.

In one embodiment, as the vehicle 102 is being driven, the barrier control module 142 may communicate with the navigation system 130 to continually determine the locational coordinates associated with the vehicle 102 as provided by the GPS 130b. The barrier control module 142 may also access the barrier profile stored on the storage unit 116 and may communicate with the navigation system 130 to determine if the vehicle 102 is entering any of the portions of the boundary 312. More specifically, the barrier control module 142 may continually compare the locational coordinates of the vehicle 102 against the plurality of GPS coordinates associated with portions of the boundary 312 to determine if they overlap with one another. If it is determined that the overlapping of the locational coordinates of the vehicle 102 occurs with the plurality of GPS coordinates associated with portions of the boundary 312, the barrier control module 142 determines that the vehicle 102 enters the inner geo-fence zone 310. For example, with reference to FIG. 3B, if the vehicle 102 is being driven out (e.g., reversed) from the garage 322, the vehicle 102 may enter the inner geo-fence zone 310 as the vehicle 102 is leaving the garage 322 and being driven down the driveway 326. In such a scenario, the barrier control module 142 may determine when the vehicle 102 enters the inner geo-fence zone 310 once the vehicle 102 crosses one of the portions of the boundary 312.

Upon determining that the vehicle 102 enters the at least one outer geo-fence zone (at block 504), or determining that the vehicle 102 enters the at least one inner geo-fence zone (at block 506), the method 500 may proceed to block 508, wherein the method 500 may include sending one or more status request data signals to the barrier controller 124. In one embodiment, the barrier control module 142 may utilize the vehicle communication system 122 to send the one or more status request data signals to the transceiver 128 to determine the current state of the barrier 104. In other words, the barrier control module 142 may send the status request data signals to determine if the barrier 104 is currently in the opened state, the closed state, or the partially opened state.

The method 500 may proceed to block 510, wherein the method 500 may include receiving one or more current state data signals from the barrier controller 124. In one or more embodiments, the barrier controller 124 may evaluate the one or more status request data signals received by the transceiver 128 and may determine the current state of the barrier 104. The barrier controller 124 may determine the current state as the opened state when the barrier 104 is in a fully opened position. Additionally, the barrier controller 124 may determine the current state as the closed state when the barrier 104 is in a fully closed position. In some embodiments, the barrier controller 124 may determine the current state of the barrier 104 as the partially opened state when the barrier 104 is partially opened. The barrier controller 124 may further determine the barrier traversing level of the barrier 104 (e.g., 65% open) when the current state of the barrier 104 is the partially opened state.

In an exemplary embodiment, upon determining the current state of the barrier 104, the barrier controller 124 may utilize the transceiver 128 to communicate the one or more current state data signals that include the current state of the barrier 104 as the opened state, the closed state, or the partially opened state to vehicle communication system 122. In some embodiments, when the barrier 104 is determined to be in the partially opened state, the current data state data signal(s) may additionally include the barrier traversing level of the barrier 104.

Figure 6:
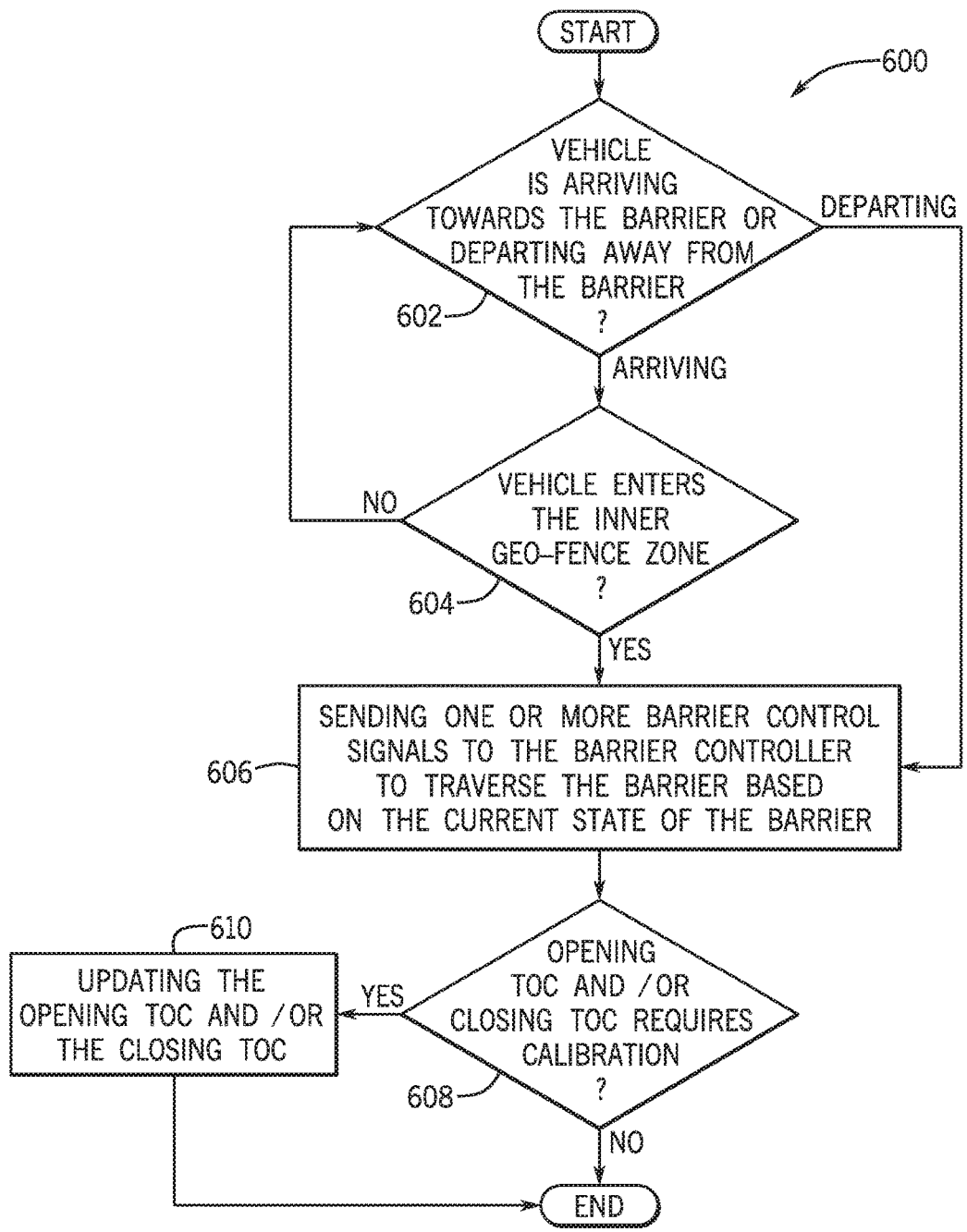
FIG. 6 is a process flow diagram of a method for sending the at least one barrier control signal to remotely control movement of the barrier within the execution mode of the barrier TOC application according to an exemplary embodiment.

Referring again to the method 200 of FIG. 2, upon determining the state of the barrier 104 (at block 206), the method 200 may proceed to block 208, wherein the method 200 may include sending at least one barrier control signal to remotely control movement of the barrier 104. Block 208 will be discussed in more detail with respect to FIG. 6, a process flow diagram of a method 600 for sending the at least one barrier control signal to remotely control movement of the barrier 104 within the execution mode of the barrier TOC application 106 according to an exemplary embodiment. FIG. 6 will be described with reference to the components of FIG. 1 though it is to be appreciated that the method of FIG. 6 may be used with other systems and/or components.

The method 600 may begin at block 602, wherein the method 600 may include determining if the vehicle 102 is arriving towards the barrier 104 or departing away from the barrier 104. As discussed in detail above, with respect to block 502, in an exemplary embodiment, the barrier control module 142 may communicate with the navigation system 130 to evaluate if the vehicle 102 is being driven towards the barrier 104 or away from the barrier 104. The navigation system 130 may communicate the results of the evaluation with the barrier control module 142 and the module 142 may respectively determine if the vehicle 102 is arriving towards the barrier 104 or the vehicle 102 is departing away from the barrier 104.

If it is determined that the vehicle 102 is arriving towards the barrier 104 (at block 602), the method may proceed to block 604, wherein the method 600 may include determining if the vehicle 102 enters the inner geo-fence zone. As discussed above with respect to the method 500, the barrier control module 142 may determine that the vehicle 102 enters one of the outer geo-fence zones 314, 316, as the vehicle 102 crosses one of the portions of the boundaries 318, 320. Accordingly, as the vehicle 102 may continue to travel through one of the outer geo-fence zones 314, 316 towards the barrier 104, the barrier control module 142 may access the barrier profile stored on the storage unit 116 and may communicate with the navigation system 130 to determine if the vehicle 102 is entering any of the portions of the boundary 312 of the inner geo-fence zone 310. More specifically, the barrier control module 142 may continue to compare the locational coordinates of the vehicle 102 against the plurality of GPS coordinates associated with portions of the boundary 312 to determine if they overlap with one another. If it is determined that the overlapping of the locational coordinates of the vehicle 102 occurs with the plurality of GPS coordinates associated with portions of the boundary 312, the barrier control module 142 determines that the vehicle 102 enters the inner geo-fence zone 310.

If it is determined that the vehicle 102 enters the inner geo-fence zone 310 (at block 604) or it is determined that the vehicle 102 is departing away from the barrier 104 (at block 602), the method 600 may proceed to block 606, wherein the method 600 may include sending one or more barrier control signals to the barrier controller 124 to traverse the barrier 104 based on the current state of the barrier 104. As discussed above with respect to block 510 of the method 500, the barrier control module 142 may determine the current state of the barrier 104 based on the receipt and evaluation of one or more current state data signals sent from the barrier controller 124.

In an exemplary embodiment, the barrier control module 142 may utilize the current state of the barrier 104 to accordingly send the one or more barrier control signals to remotely control the movement of the barrier 104 to traverse the barrier 104. More specifically, if the barrier control module 142 determines that the current state of the barrier 104 is the closed state (at block 510), the barrier control module 142 may utilize the vehicle communication system 122 to send the one or more barrier control signals to the transceiver 128 to traverse the barrier 104 from the closed state to the opened state. The barrier controller 124 may evaluate the received barrier control signals and may responsively move the barrier 104 to traverse the barrier 104 from the closed state to the opened state.

Alternatively, if the barrier control module 142 determines that the current state of the barrier 104 is the opened state (at block 510), the barrier control module 142 may utilize the vehicle communication system 122 to send the one or more barrier control signals to the transceiver 128 to traverse the barrier 104 from the closed state to the opened state. The barrier controller 124 may evaluate the received barrier control signals and may responsively move the barrier 104 to traverse the barrier 104 from the opened state to the closed state. In some embodiments, if the barrier control module 142 determines that the current state of the barrier 104 is the partially opened state (at block 510), the barrier control module 142 may be configured to utilize the vehicle communication system 122 to send the one or more barrier control signals to the transceiver 128 to traverse the barrier 104 from the partially opened state to the opened state, to fully open the barrier 104 upon the arrival of the vehicle 102. Conversely, the barrier control module 142 may be configured to utilize the vehicle communication system 122 to send the one or more barrier control signals to the transceiver 128 to traverse the barrier 104 from the partially opened state to the closed state, to fully close the barrier 104 upon the departure of the vehicle 102.

The method 600 may proceed to block 608, wherein the method 600 may include determining if the opening TOC and/or the closing TOC requires calibration. In one embodiment, when the vehicle 102 is within the predetermined measuring distance of the barrier 104, the barrier control module 142 may communicate with the barrier learning module 140 to re-measure the duration of the movement of the barrier 104 during normal operation of the barrier 104. The re-measurement may be completed to ensure that the barrier 104 is still traversing at the same rate as it was when the opening TOC and the closing TOC were populated/updated within the barrier profile. In other words, the determination of block 608 may ensure that the opening TOC and/or the closing TOC are accurate and may account for any potential wear and tear, aging, and environmental factors that may occur with respect to the components of the barrier 104 and/or the barrier controller 124 (e.g., motor, cable, etc.).

In an exemplary embodiment, as discussed above, the barrier learning module 140 may determine if the vehicle 102 is within the predetermined measuring distance. More specifically, the navigation system 130 may communicate the GPS coordinates of the vehicle 102 to the barrier learning module 140 as determined by the GPS 130b. Upon receiving the GPS coordinates of the vehicle 102, the barrier learning module 140 may access the barrier profile stored on the storage unit 116 to retrieve the geo-location associated with the barrier 104. The barrier learning module 140 may further compare the GPS coordinates of the vehicle 102 with the geo-location associated with the barrier 104 to determine if the vehicle 102 is located within the predetermined distance of the barrier 104.

Upon determining that the vehicle 102 is within the predetermined measuring distance, the barrier learning module 140 may utilize the vehicle communication system 122 to send (e.g., transmit) the one or more barrier learning execution data signals to the transceiver 128 to be interpreted by the barrier controller 124. In one embodiment, the barrier learning execution data signal(s) may indicate that the barrier controller 124 should send the plurality of barrier movement response signals while the barrier 104 is traversing based on the entrance of the vehicle 102 within the outer geo-fence zone as it's arriving towards the barrier 104 or departing away from the barrier 104. Upon interpreting the barrier learning execution data signal(s), the barrier controller 124 may utilize the transceiver 128 to send the plurality of barrier movement response signals to be analyzed by the barrier learning module 140. In particular, the barrier learning module 140 may utilize the system clock to measure a present-day duration of the movement of the barrier 104 as its being traversed from the opened state to the closed state and/or the closed state to the opened state, based on the current state of the barrier 104 (as discussed with respect to block 606).

In an alternate embodiment, the barrier learning module 140 may communicate with the image sensors 132 and the RADAR/LADAR sensors 134. As discussed above, the image sensors 132 and/or the RADAR/LADAR sensors 134 may be configured to send the plurality of barrier movement sensing signals that may indicate the direction of movement and the movement of the barrier 104 to the barrier learning module 140. The barrier learning module 140 may utilize the system clock to measure the present-day duration of the movement of the barrier 104 based on an evaluation of the plurality of barrier movement sensing signals to determine the present-day duration of the movement of the barrier 104 as its being traversed from the closed state to the opened state and/or the closed state to the opened state.

In an exemplary embodiment, the barrier learning module 140 may access the barrier profile stored on the storage unit 116 to acquire the opening TOC and/or the closing TOC. When the barrier learning module 140 determines the present-day duration of the movement of the barrier 104 as its being traversed from the opened state to the closed state, the barrier learning module 140 may compare the present-day duration to the closing TOC to determine if a variance between the two values fall within the predetermined margin of error. Additionally, when the barrier learning module 140 determines the present-day duration of the movement of the barrier 104 as its being traversed from the closed state to the opened state, the barrier learning module 140 may compare the present-day duration to the opening TOC to determine if a variance between the two values fall within the predetermined margin of error.

In one embodiment, if the barrier learning module 140 determines that the variance between the present-day duration of the movement of the barrier 104 as its being traversed from the closed state to the opened state and the opening TOC falls outside the predetermined margin of error, the barrier learning module 140 may determine that the opening TOC requires calibration. In the same way, if the barrier learning module 140 determines that the variance between the present-day duration of the movement of the barrier 104 as its being traversed from the opened state to the closed state and the closing TOC falls outside the predetermined margin of error, the barrier learning module 140 may determine that the closing TOC requires calibration.

If it is determined that the opening TOC and/or the closing TOC require calibration (at block 608), the method 600 may proceed to block 610, wherein the method 600 may include updating the opening TOC and/or the closing TOC. In one embodiment, upon determining that the variance between the present-day duration of the movement of the barrier 104 as its being traversed from the closed state to the opened state and the opening TOC falls outside the predetermined margin of error, the barrier learning module 140 may access the barrier profile and update the opening TOC with a value that reflects the present-day duration of the movement of the barrier 104 as its being traversed from the closed state to the opened state. The updated value is subsequently applied as the opening TOC during the execution of the application 106. Similarly, upon determining that the variance between the present-day duration of the movement of the barrier 104 as its being traversed from the opened state to the closed state and the closing TOC falls outside the predetermined margin of error, the barrier learning module 140 may access the barrier profile and update the closing TOC with the value that reflects the present-day duration of the movement of the barrier 104 as its being traversed from the opened state to the closed state. The updated value is subsequently applied as the closing TOC during the execution of the application 106.

Figure 7A:
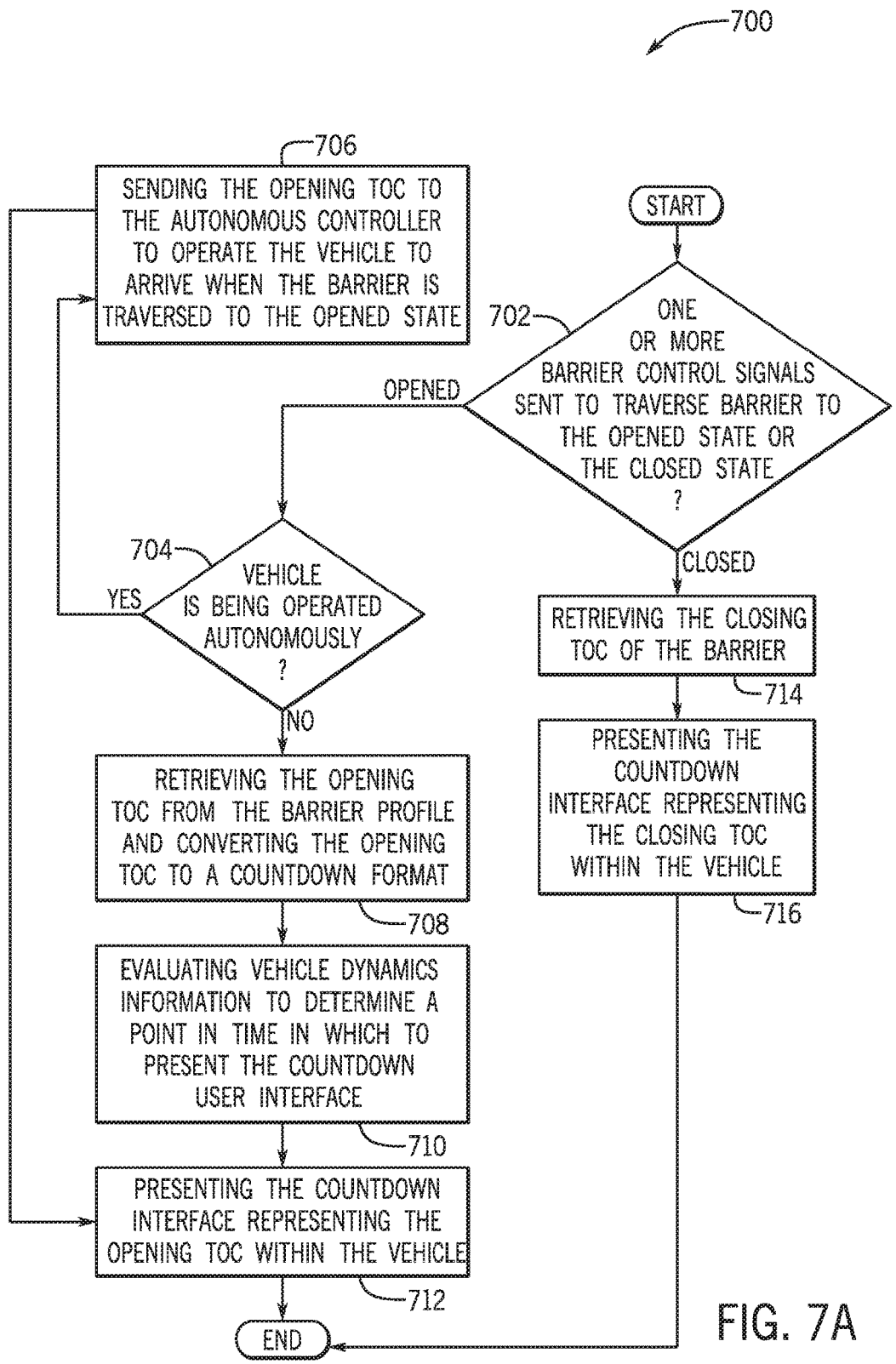
FIG. 7A is a process flow diagram of a method for presenting the countdown notification relating to the movement of the barrier within the execution mode of the barrier TOC application according to an exemplary embodiment.

Referring again to the method 200 of FIG. 2, upon sending the at least one barrier control signal to remotely control movement of the barrier 104 (at block 208), the method 200 may proceed to block 210, wherein the method 200 may include presenting the countdown notification relating to the movement of the barrier 104. Block 206 will be discussed in more detail with respect to FIG. 7A, a process flow diagram of a method 700 for presenting the countdown notification relating to the movement of the barrier 104 within the execution mode of the barrier TOC application 106 according to an exemplary embodiment. FIG. 7A will be described with reference to the components of FIG. 1 though it is to be appreciated that the method of FIG. 7A may be used with other systems and/or components.

The method 700 may begin at block 702, wherein the method 700 may include determining if the one or more barrier control signals have been sent to traverse the barrier 104 to the opened state or the closed state. In an exemplary embodiment, upon sending the barrier control signals to remotely control the movement of the barrier 104 to traverse the barrier 104 to the opened state or the closed state, the barrier control module 142 may communicate data that includes details regarding the sending of the signal(s) to the barrier TOC module 144. The barrier TOC module 144 may analyze the data and may determine if the one or more barrier control signals have been sent to traverse the barrier 104 to the opened state or the closed state. In particular, this determination pertains to the approaching of the vehicle 102 towards the barrier 104 or the departing of the vehicle 102 away from the barrier 104 and is used by the barrier TOC module 144 to accordingly provide notification(s) and/or control of the vehicle 102, as discussed in more detail below.

If it is determined that the one or more barrier control signals have been sent to traverse the barrier 104 to the opened state (at block 702), the method 700 may proceed to block 704, wherein the method 700 includes determining if the vehicle 102 is being operated autonomously. In one embodiment, the barrier TOC module 144 may communicate with the autonomous controller 108 to determine if the autonomous controller 108 is operating the vehicle 102 autonomously. As discussed, the autonomous controller 108 may be operably connected to one or more components of the vehicle 102 to provide the partially autonomous vehicle operation or the fully autonomous vehicle operation.

If it is determined that the vehicle 102 is being operated autonomously (at block 704), the method 700 may proceed to block 706, wherein the method 700 may include sending the opening TOC to the autonomous controller 108 to operate the vehicle 102 to arrive when the barrier 104 is traversed to the opened state. In one or more embodiments, the barrier TOC module 144 may access the barrier profile stored on the storage unit 116 to retrieve the stored opening TOC. Upon retrieving the stored opening TOC, the barrier TOC module 144 may communicate the opening TOC to the autonomous controller 108. The autonomous controller 108 may be configured to analyze the opening TOC and to operate the vehicle 102 to arrive towards the barrier 104 and ultimately reach the location of the barrier 104 upon the barrier 104 being traversed to the opened state. In other words, the autonomous controller 108 may determine the amount of time required for the barrier 104 to traverse from the closed state to the opened state based on the opening TOC and may operate the vehicle 102 (e.g., by acceleration, braking, steering, etc.) to ensure that the vehicle 102 arrives at the location of the barrier 104 upon the barrier 104 being fully opened. This functionality may allow for optimal efficiency with respect to fuel utilization and timing as the vehicle 102 may not have to stop and wait for the barrier 104 to be fully opened.

If it is determined that the vehicle 102 is not being operated autonomously (at block 704), the method 700 may proceed to block 708, wherein the method 700 may include retrieving the opening TOC of the barrier 104 and converting the opening TOC to a countdown format. As discussed above, the barrier TOC module 144 may access the barrier profile stored on the storage unit 116 to retrieve the opening TOC previously populated/updated on the barrier profile. Upon accessing the opening TOC, the barrier TOC module 144 may convert the opening TOC time based value to the countdown format. In particular, the countdown format may be indicative of a countdown that represents the timeframe required to traverse the barrier 104 from the (fully) closed state or the partially opened state to the (fully) opened state.

The method 700 may proceed to block 710, wherein the method 700 may include evaluating vehicle dynamics information to determine a point in time at which to present the countdown interface. In one or more embodiments, the barrier TOC module 144 may communicate with the vehicle dynamics sensors 136 to access the vehicle dynamics information that pertains to the operation of the vehicle 102. More particularly, the barrier TOC module 144 may evaluate the vehicle dynamics information to determine the vehicle speed, the vehicle braking, the vehicle steering, the engine RPM, and the like. Upon evaluating the vehicle dynamics information, the barrier TOC module 144 may determine the point in time at which to present the countdown interface such that the countdown notification is provided to the driver of the vehicle 102 at a requisite time based on the speed and operation of the vehicle 102 as it travels through the inner geo-fence zone towards the location of the barrier 104.

In other words, the barrier TOC module 144 may evaluate the vehicle dynamics information upon the vehicle 102 entering the inner geo-fence zone and sending the barrier control signal to determine a point in time in which the barrier TOC application 106 should present the countdown interface including the countdown notification in synchronization with the arrival of the vehicle 102 towards the barrier 104. For example, when the vehicle 102 is being driven at a high rate of speed through the inner geo-fence zone the barrier TOC module 144 may determine to present the countdown notification at an earlier point in time than when the vehicle 102 is being driven at a low rate of speed through the inner geo-fence zone to ensure that the countdown notification is presented in synchronization with the arrival of the vehicle 102 towards the barrier 104.

The method 700 may proceed to block 712, wherein the method 700 may include presenting the countdown interface representing the opening TOC within the vehicle 102. In an exemplary embodiment, upon determining the point in time at which to present the countdown interface, the barrier TOC module 144 may communicate one or more data signals to the head unit 112 to present the countdown interface on the display unit 114 of the vehicle 102 as part of the vehicle HMI at the determined point in time.

Figure 7B:
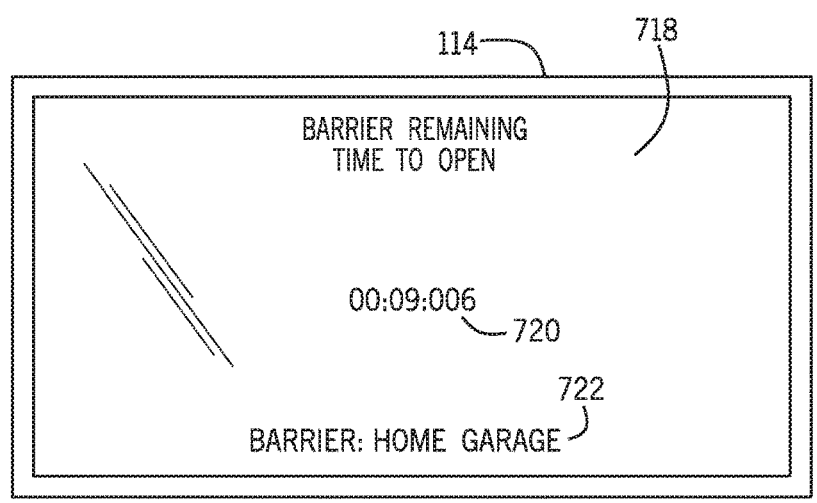
FIG. 7B is an illustrative example of a countdown interface presented on a display unit of the vehicle according to an exemplary embodiment.

FIG. 7B is an illustrative example of the countdown interface 718 presented on the display unit 114 of the vehicle 102 according to an exemplary embodiment. As shown, the countdown interface 718 may include the countdown notification 720 that presents a running countdown that is representative of the countdown format indicating the opening TOC of the barrier 104. The countdown interface 718 may additionally include the name 722 assigned to the barrier 104 as retrieved by the barrier TOC module 144.

In one or more embodiments, during the movement of the barrier 104, the countdown interface 718 may present an abort input object (e.g., user interface button) (not shown) that may be inputted by the user to stop the opening of the barrier 104. In particular, when the abort input object is inputted by the user, the barrier TOC module 144 may communicate the inputting of the object to the barrier control module 142. The barrier control module 142 may respectively send one or more barrier control signals to the barrier controller 124 to abort the traversing of the barrier 104 from the closed state to the opened state. Upon receiving the barrier control signal(s), the barrier controller 124 may stop the movement of the barrier 104.

In one or more embodiments, upon completely traversing from the closed state to the opened state, the barrier controller 124 may utilize the transceiver 128 to send the current state data signal(s) to indicate the state of the barrier 104. Upon the vehicle communication system 122 receiving the current state data signal(s), and the barrier TOC module 144 evaluating the signal(s), the barrier TOC module 144 may present a notification (not shown) on the countdown interface 718 that indicates that the barrier 104 has completed traversing from the closed state to the opened state. Accordingly, the countdown notification 720 may be initially be presented as a graphic that represents a number of seconds and milliseconds remaining for the barrier 104 to traverse from the closed state to the opened state. When the barrier 104 has completely traversed from the closed state to the opened state, the countdown notification 720 may be presented as a graphic that represents the barrier 104 in the opened state.

With continued reference to the method 700 of FIG. 7A, if it is determined that one or more barrier control signals have been sent to traverse the barrier 104 to the closed state (at block 702), the method 700 may proceed to block 714, wherein the method 700 may include retrieving the closing TOC from the barrier profile and converting the closing TOC to a countdown format. In one embodiment, the barrier TOC module 144 may access the barrier profile stored on the storage unit 116 to retrieve the closing TOC previously populated/updated on the barrier profile. Upon accessing the closing TOC, the barrier TOC module 144 may convert the closing TOC time based value to the countdown format that may be indicative of a countdown that represents the timeframe required to traverse the barrier 104 from the (fully) opened state or the partially opened state to the (fully) closed state.

The method 700 may proceed to block 716, wherein the method 700 may include presenting the countdown interface representing the closing TOC within the vehicle 102. In an exemplary embodiment, the barrier TOC module 144 may communicate one or more data signals to the head unit 112 to present the countdown interface on the display unit 114 of the vehicle 102 as part of the vehicle HMI. The countdown interface may be presented in a similar manner as the illustrative example shown in FIG. 7B that includes the countdown notification as a running countdown that is representative of the countdown format indicating the closing TOC of the barrier 104.

In one or more embodiments, during the movement of the barrier 104, the countdown interface 718 may present the abort input object (e.g., user interface button) that may be inputted by the user to stop the closing of the barrier 104. In particular, when the abort input object is inputted by the user, the barrier TOC module 144 may communicate the inputting of the object to the barrier control module 142. The barrier control module 142 may respectively send one or more barrier control signals to the barrier controller 124 to abort the traversing of the barrier 104 from the opened state to the closed state. Upon receiving the barrier control signal(s), the barrier controller 124 may stop the movement of the barrier 104.

In one or more embodiments, upon completely traversing from the opened state to the closed state, the barrier controller 124 may utilize the transceiver 128 to send the current state data signal(s) to indicate the state of the barrier 104. Upon the vehicle communication system 122 receiving the current state data signal(s), and the barrier TOC module 144 evaluating the signal(s), the barrier TOC module 144 may present a notification on the countdown interface that indicates that the barrier 104 has completed traversing from the opened state to the closed state. As an illustrative example, the countdown notification may be presented as a graphic that represents a number of seconds and milliseconds remaining for the barrier 104 to traverse from the opened state to the closed state. When the barrier 104 has completely traversed from the opened state to the closed state, the countdown notification may be presented as a graphic that represents the barrier 104 in the closed state.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing a countdown notification relating to a movement of a barrier, comprising: measuring a duration of the movement of the barrier; determining a current state of the barrier, wherein the current state of the barrier includes at least one of: an opened state and a closed state; sending at least one barrier control signal to remotely control movement of the barrier, wherein the at least one barrier control signal is based on the current state of the barrier; and presenting the countdown notification within a vehicle relating to the movement of the barrier, wherein the countdown notification is presented at a point in time that is based on an evaluation of a location and vehicle dynamics information of the vehicle that is arriving towards the barrier or departing away from the barrier, wherein the evaluation of vehicle dynamics information of the vehicle includes evaluating at least one of: vehicle speed, vehicle braking, vehicle steering, and engine RPM, wherein the countdown notification includes a running countdown of the duration of the movement of the barrier that indicates a remaining time to traverse the barrier from at least one of: the closed state to the opened state, or the opened state to the closed state.

2. The computer-implemented method of claim 1, further including determining an inner geo-fence zone that is within a predetermined vicinity of the barrier and at least one outer geo-fence zone that is within a predetermined vicinity of the barrier, wherein determining the inner geo-fence zone and the at least one outer geo-fence zone includes determining and storing a plurality of global positioning coordinates associated with a first predetermined area within a barrier profile associated with the barrier to indicate boundaries of the inner geo-fence zone and determining and storing a plurality of global positioning coordinates associated with at least one additional predetermined area to indicate boundaries of the at least one outer geo-fence zone within the barrier profile associated with the barrier, wherein a size of the inner geo-fence zone is based on a surrounding environment of the barrier as determined based on at one of: a street, a driveway, a surrounding structure, and a surrounding object.

3. The computer-implemented method of claim 1, wherein measuring the duration of the movement of the barrier includes receiving a plurality of signals from a barrier controller that indicate at least one of: an opening of the barrier, and a closing of the barrier.

4. The computer-implemented method of claim 3, wherein measuring the duration of the movement of the barrier includes evaluating the plurality of signals received from the barrier controller, wherein the plurality of signals are evaluated with respect to a system clock of an electronic control unit to measure the duration of the movement of the barrier based on a calculation of a duration of time that the plurality of signals are received.

5. The computer-implemented method of claim 1, wherein determining the current state of the barrier includes sending at least one status request data signal to a barrier controller and receiving at least one current state data signal from the barrier controller to determine the current state of the barrier.

6. The computer-implemented method of claim 5, wherein determining the current state of the barrier includes determining if the vehicle is arriving towards the barrier and sending the at least one status request data signal to the barrier controller when the vehicle enters at least one outer geo-fence zone that is within a predetermined vicinity of the barrier, wherein the vehicle enters the at least one outer geo-fence zone prior to entering an inner geo-fence zone that is within a predetermined vicinity of the barrier when the vehicle is arriving towards the barrier.

7. The computer-implemented method of claim 6, wherein determining the current state of the barrier includes determining if the vehicle is departing away from the barrier and sending the at least one status request data signal to the barrier controller when the vehicle enters the inner geo-fence zone.

8. The computer-implemented method of claim 6, wherein sending the at least one barrier control signal to remotely control movement of the barrier includes sending the at least one barrier control signal upon the vehicle entering the inner geo-fence zone.

9. The computer-implemented method of claim 1, wherein sending the at least one barrier control signal to remotely control movement of the barrier includes sending the at least one barrier control signal to remotely control the movement of the barrier to traverse the barrier from the closed state to the opened state when the current state of the barrier is the closed state and sending the at least one barrier control signal to remotely control the movement of the barrier to traverse the barrier from the opened state to the closed state when the current state of the barrier is the opened state.

10. A system for providing a countdown notification relating to a movement of a barrier, comprising: a memory storing instructions when executed by a processor cause the processor to: measure a duration of the movement of the barrier; determine a current state of the barrier, wherein the current state of the barrier includes at least one of: an opened state and a closed state; send at least one barrier control signal to remotely control movement of the barrier, wherein the at least one barrier control signal is based on the current state of the barrier; and present the countdown notification within a vehicle relating to the movement of the barrier, wherein the countdown notification is presented at a point in time that is based on an evaluation of a location and vehicle dynamics information of the vehicle that is arriving towards the barrier or departing away from the barrier, wherein the evaluation of vehicle dynamics information of the vehicle includes evaluating at least one of: vehicle speed, vehicle braking, vehicle steering, and engine RPM, wherein the countdown notification includes a running countdown of the duration of the movement of the barrier that indicates a remaining time to traverse the barrier from at least one of: the closed state to the opened state, or the opened state to the closed state.

11. The system of claim 10, further including determining an inner geo-fence zone that is within a predetermined vicinity of the barrier and at least one outer geo-fence zone that is within a predetermined vicinity of the barrier, wherein determining the inner geo-fence zone and the at least one outer geo-fence zone includes determining and storing a plurality of global positioning coordinates associated with a first predetermined area within a barrier profile associated with the barrier to indicate boundaries of the inner geo-fence zone and determining and storing a plurality of global positioning coordinates associated with at least one additional predetermined area to indicate boundaries of the at least one outer geo-fence zone within the barrier profile associated with the barrier, wherein a size of the inner geo-fence zone is based on a surrounding environment of the barrier as determined based on at one of: a street, a driveway, a surrounding structure, and a surrounding object.

12. The system of claim 10, wherein measuring the duration of the movement of the barrier includes receiving a plurality of signals from a barrier controller that indicate at least one of: an opening of the barrier, and a closing of the barrier.

13. The system of claim 12, wherein measuring the duration of the movement of the barrier includes evaluating the plurality of signals received from the barrier controller, wherein the plurality of signals are evaluated with respect to a system clock of an electronic control unit to measure the duration of the movement of the barrier based on a calculation of a duration of time that the plurality of signals are received.

14. The system of claim 10, wherein determining the current state of the barrier includes sending at least one status request data signal to a barrier controller and receiving at least one current state data signal from the barrier controller to determine the current state of the barrier.

15. The system of claim 14, wherein determining the current state of the barrier includes determining if the vehicle is arriving towards the barrier and sending the at least one status request data signal to the barrier controller when the vehicle enters at least one outer geo-fence zone that is within a predetermined vicinity of the barrier, wherein the vehicle enters the at least one outer geo-fence zone prior to entering an inner geo-fence zone that is within a predetermined vicinity of the barrier when the vehicle is arriving towards the barrier.

16. The system of claim 15, wherein determining the current state of the barrier includes determining if the vehicle is departing away from the barrier and sending the at least one status request data signal to the barrier controller when the vehicle enters the inner geo-fence zone.

17. The system of claim 15, wherein sending the at least one barrier control signal to remotely control movement of the barrier includes sending the at least one barrier control signal upon the vehicle entering the inner geo-fence zone.

18. The system of claim 10, wherein sending the at least one barrier control signal to remotely control movement of the barrier includes sending the at least one barrier control signal to remotely control the movement of the barrier to traverse the barrier from the closed state to the opened state when the current state of the barrier is the closed state and sending the at least one barrier control signal to remotely control the movement of the barrier to traverse the barrier from the opened state to the closed state when the current state of the barrier is the opened state.

19. A non-transitory computer readable storage medium storing instructions that when executed by a computer, which includes a processor that performs a method, the method comprising: measuring a duration of a movement of a barrier; determining a current state of the barrier, wherein the current state of the barrier includes at least one of: an opened state and a closed state; sending at least one barrier control signal to remotely control movement of the barrier, wherein the at least one barrier control signal is based on the current state of the barrier; and presenting the countdown notification within a vehicle relating to the movement of the barrier, wherein the countdown notification is presented at a point in time that is based on an evaluation of a location and vehicle dynamics information of the vehicle that is arriving towards the barrier or departing away from the barrier, wherein the evaluation of vehicle dynamics information of the vehicle includes evaluating at least one of: vehicle speed, vehicle braking, vehicle steering, and engine RPM, wherein the countdown notification includes a running countdown of the duration of the movement of the barrier that indicates a remaining time to traverse the barrier from at least one of: the closed state to the opened state, or the opened state to the closed state.

20. The non-transitory computer readable storage medium of claim 19, wherein sending the at least one barrier control signal to remotely control movement of the barrier includes sending the at least one barrier control signal to remotely control the movement of the barrier to traverse the barrier from the closed state to the opened state when the current state of the barrier is the closed state and sending the at least one barrier control signal to remotely control the movement of the barrier to traverse the barrier from the opened state to the closed state when the current state of the barrier is the opened state.

* * * * *